(12) United States Patent  
Katsuki et al.

(10) Patent No.: US 11,655,001 B2  
(45) Date of Patent: May 23, 2023

(54) HUMAN-POWERED VEHICLE CONTROL DEVICE

(71) Applicant: Shimano Inc., Osaka (JP)

(72) Inventors: Takuya Katsuki, Osaka (JP); Yasuhiro Tsuchizawa, Osaka (JP)

(73) Assignee: Shimano Inc., Osaka (JP)

( * ) Notice: Subject to any disclaimer, the term of this patent is extended or adjusted under 35 U.S.C. 154(b) by 430 days.

(21) Appl. No.: 16/268,015

(22) Filed: Feb. 5, 2019

(65) Prior Publication Data

US 2019/0248444 A1    Aug. 15, 2019

(30) Foreign Application Priority Data

Feb. 9, 2018 (JP) .............................. JP2018-022443

(51) Int. Cl.
| | |
|---|---|
| *B62M 6/50* | (2010.01) |
| *B62J 43/13* | (2020.01) |
| *B62J 43/20* | (2020.01) |
| *B62J 45/415* | (2020.01) |
| *B62J 45/40* | (2020.01) |

(52) U.S. Cl.
CPC ............... *B62M 6/50* (2013.01); *B62J 43/13* (2020.02); *B62J 43/20* (2020.02); *B62J 45/4151* (2020.02); *B62J 45/40* (2020.02)

(58) Field of Classification Search
CPC ... B62M 6/50; B62J 99/00; B62J 45/20; B62J 45/40
See application file for complete search history.

(56) References Cited

U.S. PATENT DOCUMENTS

| 7,949,454 B2 * | 5/2011 | Graf ...................... B60T 8/1755 |
| | | 701/70 |
| 10,821,970 B2 * | 11/2020 | Wahl ..................... B60W 30/02 |
| 2002/0100628 A1 * | 8/2002 | Jones ....................... B62M 6/45 |
| | | 180/220 |

(Continued)

FOREIGN PATENT DOCUMENTS

| DE | 10 2011 082 086 A1 | 3/2013 |
| DE | 10 2011 082 088 A1 | 3/2013 |

(Continued)

*Primary Examiner* — Peter D Nolan  
*Assistant Examiner* — Roy Rhee  
(74) *Attorney, Agent, or Firm* — Global IP Counselors, LLP

(57) ABSTRACT

A human-powered vehicle control device includes an electronic controller that is configured to control a motor that assists in propulsion of a human-powered vehicle and that stops assisting in the propulsion of the human-powered vehicle at a timing suitable for a state of the human-powered vehicle or a state of a road. The electronic controller drives the motor in correspondence with a human drive force upon determining a traveling speed of the human-powered vehicle is less than a predetermined speed that is higher than 0 km/h. The electronic controller varies the predetermined speed in correspondence with at least one of a state of the human-powered vehicle and a state of a road on which the human-powered vehicle travels. The electronic controller does not assist the propulsion of the human-powered vehicle upon determining the traveling speed of the human-powered vehicle is greater than or equal to the predetermined speed.

34 Claims, 8 Drawing Sheets

(56) References Cited

U.S. PATENT DOCUMENTS

| | | | |
|---|---|---|---|
| 2007/0066443 A1* | 3/2007 | Matsudaira | F16H 61/0213 |
| | | | 477/115 |
| 2013/0311020 A1* | 11/2013 | Searles | B62M 6/50 |
| | | | 701/22 |
| 2014/0053030 A1* | 2/2014 | Lee | G06F 12/16 |
| | | | 714/49 |
| 2015/0314790 A1* | 11/2015 | Deragarden | B60Q 9/008 |
| | | | 703/8 |
| 2016/0332532 A1* | 11/2016 | Ro | B60L 58/15 |
| 2017/0057595 A1* | 3/2017 | Peng | B62M 6/90 |
| 2017/0136842 A1* | 5/2017 | Anderson | B60G 17/0195 |
| 2019/0016409 A1* | 1/2019 | Tetsuka | B62K 25/02 |
| 2019/0241234 A1 | 8/2019 | Hattori et al. | |
| 2020/0019431 A1* | 1/2020 | Kim | G06F 9/48 |

FOREIGN PATENT DOCUMENTS

| | | |
|---|---|---|
| DE | 10 2016 209 560 B3 | 9/2017 |
| JP | 10-59260 A | 3/1998 |
| JP | 11-105776 A | 4/1999 |
| JP | 2001-199378 A | 7/2001 |
| JP | 2011-230664 A | 11/2011 |
| JP | 2016-107738 A | 6/2016 |
| JP | 2019-137119 A | 8/2019 |

* cited by examiner

HUMAN-POWERED VEHICLE CONTROL DEVICE

CROSS-REFERENCE TO RELATED APPLICATIONS

This application claims priority to Japanese Patent Application No. 2018-022443, filed on Feb. 9, 2018. The entire disclosure of Japanese Patent Application No. 2018-022443 is hereby incorporated herein by reference.

BACKGROUND

Technical Field

The present invention generally relates to a human-powered vehicle control device.

Background Information

The human-powered vehicle includes a motor assisting propulsion of a human-powered vehicle and an electronic controller configured to control the motor. The electronic controller does not assist in the propulsion of the human-powered vehicle by the motor in a case where a vehicle speed of the human-powered vehicle is greater than or equal to a predetermined speed (refer to, for example, Japanese Laid-Open Patent Publication No. 10-59260).

SUMMARY

It is preferred that the timing of stopping the assistance of the propulsion of the human-powered vehicle by the motor be changed in a suitable manner in accordance with a state of the human-powered vehicle or a state of the road. One object of the present disclosure is to provide a human-powered vehicle control device configured to stop the assistance of the propulsion of a human-powered vehicle at a timing suitable for at least one of a state of a human-powered vehicle and a state of a road.

A human-powered vehicle control device in accordance with a first aspect of the present disclosure comprises an electronic controller configured to control a motor that assists in propulsion of a human-powered vehicle. The electronic controller is further configured to drive the motor in correspondence with human drive force upon determining a traveling speed of the human-powered vehicle is less than a predetermined speed that is higher than 0 km/h. The electronic controller is further configured to vary the predetermined speed in correspondence with at least one of a state of the human-powered vehicle and a state of a road on which the human-powered vehicle travels, and the electronic controller is further configured to restricts assistance of the propulsion of the human-powered vehicle upon determining the traveling speed of the human-powered vehicle is greater than or equal to the predetermined speed.

In accordance with the first aspect, the assistance of the propulsion of the human-powered vehicle can be stopped at a timing suitable for at least one of the state of the human-powered vehicle and the state of the road on which the human-powered vehicle travels.

In accordance with a second aspect of the present disclosure, the human-powered vehicle control device according to the first aspect is configured so that the state of the human-powered vehicle includes a first state and a second state that differs from the first state, and the electronic controller is further configured to set the predetermined speed to a first predetermined speed in the first state. The electronic controller is further configured to set the predetermined speed to a second predetermined speed that is lower than the first predetermined speed in the second state.

In accordance with the second aspect, a plurality of predetermined speeds can be set in correspondence with the state of the human-powered vehicle. Therefore, a predetermined speed suitable for the state of the human-powered vehicle can be set.

In accordance with a third aspect of the present disclosure, the human-powered vehicle control device according to the second aspect is configured so that the first predetermined speed is a fixed value.

In accordance with the third aspect, the assistance of the propulsion of the human-powered vehicle can be executed or stopped in an ensured manner.

In accordance with a fourth aspect of the present disclosure, the human-powered vehicle control device according to any one of the first to third aspects is configured so that the electronic controller is further configured not to drive the motor upon determining the human-powered vehicle is traveling at a traveling speed exceeding the predetermined speed.

In accordance with the fourth aspect, erroneous assistance of the propulsion of the human-powered vehicle can be prevented.

In accordance with a fifth aspect of the present disclosure, the human-powered vehicle control device according to any one of the first to fourth aspects is configured so that the state of the human-powered vehicle includes at least one of a state of the traveling speed of the human-powered vehicle, a state of an angle of the human-powered vehicle, a state of a handlebar steering angle of the human-powered vehicle, and a turning state of the human-powered vehicle.

In accordance with the fifth aspect, a predetermined speed suitable for the state of the human-powered vehicle can be set.

In accordance with a sixth aspect of the present disclosure, the human-powered vehicle control device according to any one of the first to fifth aspects is configured so that the electronic controller is further configured to vary the predetermined speed in correspondence with the traveling speed of the human-powered vehicle and at least one of a handlebar steering angle of the human-powered vehicle and an angle of the human-powered vehicle.

In accordance with the sixth aspect, the predetermined speed is varied in correspondence with whether the human-powered vehicle is in a straight state or a turning state and the state of the traveling speed of the human-powered vehicle, which serve as the state of the human-powered vehicle. This allows the predetermined speed to be set so as to be suitable for finer states of the human-powered vehicle.

In accordance with a seventh aspect of the present disclosure, the human-powered vehicle control device according to the fifth or the sixth aspect is configured so that the angle of the human-powered vehicle includes at least one of a yaw angle, a pitch angle, and a roll angle.

In accordance with the seventh aspect, the state of the angle of the human-powered vehicle can be suitably detected.

In accordance with an eighth aspect of the present disclosure, the human-powered vehicle control device according to the fifth or the seventh aspect is configured so that the electronic controller is further configured to vary the predetermined speed in correspondence with the angle of the human-powered vehicle.

In accordance with the eighth aspect, a predetermined speed suitable for the state of the angle of the human-powered vehicle can be set.

In accordance with a ninth aspect of the present disclosure, the human-powered vehicle control device according to any one of the fifth, seventh, and eighth aspect is configured so that the electronic controller is further configured to set the predetermined speed to a first predetermined speed upon determining a roll angle serving as the angle of the human-powered vehicle is less than a first roll angle, and the electronic controller is further configured to set the predetermined speed to a second speed that is lower than the first predetermined speed upon determining the roll angle is greater than or equal to the first roll angle.

In accordance with the ninth aspect, a predetermined speed suitable for the state of the angle of the human-powered vehicle can be set.

In accordance with a tenth aspect of the present disclosure, the human-powered vehicle control device according to any one of the fifth, seventh, and eighth aspect is configured so that the electronic controller is further configured to set the predetermined speed to a first predetermined speed upon determining the handlebar steering angle of the human-powered vehicle is less than a first steering angle, and the electronic controller is further configured to set the predetermined speed to a second speed that is lower than the first predetermined speed upon determining the handlebar steering angle is greater than or equal to the first steering angle.

In accordance with the tenth aspect, a predetermined speed suitable for the state of the handlebar steering angle of the human-powered vehicle can be set.

In accordance with an eleventh aspect of the present disclosure, the human-powered vehicle control device according to any one of the fifth, and the eighth to tenth aspects is configured so that the electronic controller is further configured to detect that the human-powered vehicle is in the turning state from the traveling speed of the human-powered vehicle and at least one of the angle of the human-powered vehicle and the handlebar steering angle of the human-powered vehicle.

In accordance with the eleventh aspect, the turning state of the human-powered vehicle can be detected in a preferred manner.

In accordance with a twelfth aspect of the present disclosure, the human-powered vehicle control device according to any one of the fifth, and the eighth to eleventh aspects is configured so that in a case where the human-powered vehicle is in the turning state, the electronic controller is further configured to set the predetermined speed to the traveling speed of the human-powered vehicle at a time point in which the turning state of the human-powered vehicle started upon determining the human-powered vehicle is in the turning state.

In accordance with the twelfth aspect, a predetermined speed suitable for the turning state of the human-powered vehicle can be set.

In accordance with a thirteenth aspect of the present disclosure, the human-powered vehicle control device according to any one of the fifth, and the eighth to eleventh aspects is configured so that the electronic controller is further configured to set the predetermined speed to an average value of the traveling speed of the human-powered vehicle for a period from a time point in which the turning state of the human-powered vehicle started until a predetermined time upon determining the human-powered vehicle is in the turning state.

In accordance with the thirteenth aspect, a predetermined speed suitable for the turning state of the human-powered vehicle can be set.

In accordance with a fourteenth aspect of the present disclosure, the human-powered vehicle control device according to any one of the fifth, and the eighth to eleventh aspects is configured so that the electronic controller is further configured to set the predetermined speed to an average value of the traveling speed of the human-powered vehicle for a case where the human-powered vehicle travels over a distance from a predetermined location to a location where the turning state of the human-powered vehicle started upon determining the human-powered vehicle is in the turning state.

In accordance with the fourteenth aspect, a predetermined speed suitable for the turning state of the human-powered vehicle can be set.

In accordance with a fifteenth aspect of the present disclosure, the human-powered vehicle control device according to any one of the fifth, and the eighth to fourteenth aspects is configured so that the electronic controller is further configured to vary the predetermined speed during at least part of a period from a time point in which the turning state of the human-powered vehicle started until a time point in which the turning state ended.

In accordance with the fifteenth aspect, the predetermined speed can be varied to an appropriate predetermined speed according to the turning state during turning of the human-powered vehicle.

In accordance with a sixteenth aspect of the present disclosure, the human-powered vehicle control device according to any one of the fifth and the eighth to fifteenth aspects is configured so that the electronic controller is further configured to vary the predetermined speed in correspondence with a stable state of the human-powered vehicle upon determining the human-powered vehicle is in the turning state.

In accordance with the sixteenth aspect, the predetermined speed can be varied in correspondence with the turning state of the human-powered vehicle during turning of the human-powered vehicle.

In accordance with a seventeenth aspect of the present disclosure, the human-powered vehicle control device according to the sixteenth aspect is configured so that the electronic controller is further configured to vary the predetermined speed based on the stable state, which includes an oversteering state in which the human-powered vehicle is oversteering while in the turning state, an understeering state in which the human-powered vehicle is understeering while in the turning state, and a stable traveling state in which the oversteering or the understeering has been reduced.

In accordance with the seventeenth aspect, the predetermined speed can be varied in correspondence with the turning state of the human-powered vehicle during turning of the human-powered vehicle.

In accordance with an eighteenth aspect of the present disclosure, in the human-powered vehicle control device according to the seventeenth aspect, the electronic controller is further configured to vary the predetermined speed so that the stable state of the human-powered vehicle approaches the stable traveling state.

In accordance with the eighteenth aspect, the assistance of the propulsion of the human-powered vehicle can be controlled so that a posture of the human-powered vehicle stabilizes during turning of the human-powered vehicle.

In accordance with a nineteenth aspect of the present disclosure, the human-powered vehicle control device according to the seventeenth or the eighteenth aspect is configured so that the electronic controller is further configured to lower the predetermined speed upon determining the stable state is the understeering state.

In accordance with the nineteenth aspect, the human-powered vehicle easily enters the stable traveling state during turning of the human-powered vehicle.

In accordance with a twentieth aspect of the present disclosure, the human-powered vehicle control device according to the seventeenth or the eighteenth aspect is configured so that the electronic controller is further configured to raise the predetermined speed upon determining the stable state is the oversteering state.

In accordance with the twentieth aspect, the human-powered vehicle easily enters the stable traveling state during turning of the human-powered vehicle.

In accordance with a twenty-first aspect of the present disclosure, the human-powered vehicle control device according to the seventeenth or the eighteenth aspect is configured so that the electronic controller is further configured not to vary the predetermined speed upon determining the stable state is the stable traveling state.

In accordance with the twenty-first aspect, the human-powered vehicle can maintain the stable traveling state during turning of the human-powered vehicle.

In accordance with a twenty-second aspect of the present disclosure, the human-powered vehicle control device according to any one of the sixteenth to twenty-first aspect is configured so that the electronic controller is further configured to calculate the stable state of the human-powered vehicle in correspondence with the traveling speed of the human-powered vehicle and at least one of a handlebar steering angle of the human-powered vehicle, an angle of the human-powered vehicle, and a wheelbase of the human-powered vehicle.

In accordance with the twenty-second aspect, the stable state of the human-powered vehicle can be detected in a preferred manner.

In accordance with a twenty-third aspect of the present disclosure, the human-powered vehicle control device according to any one of the fifth, and the eighth to twenty-second aspect is configured so that the electronic controller is further configured to vary the predetermined speed to a predetermined speed that was set before being varied in the turning state upon determining the turning state of the human-powered vehicle has ended.

In accordance with the twenty-third aspect, the predetermined speed can be varied to a predetermined speed suitable for a state in which the human-powered vehicle is not turning state, for example, in a state in which the human-powered vehicle is traveling straight.

In accordance with a twenty-fourth aspect of the present disclosure, the human-powered vehicle control device according to any one of the first to fifteenth aspect is configured so that the electronic controller is further configured to vary the predetermined speed in correspondence with a road surface resistance of the road.

In accordance with the twenty-fourth aspect, the predetermined speed can be varied to a predetermined speed suitable for the state of the road on which the human-powered vehicle travels.

In accordance with the twenty-fifth aspect of the present disclosure, the human-powered vehicle control device according to any one of the first to fifteenth aspects and the twenty-fourth aspect further comprises storage having a plurality of road surface resistance values that are selectable in correspondence with the road, and the electronic controller is further configured to vary the predetermined speed based on a selected road surface resistance value from the road surface resistances prestored in the storage in which the selected road surface resistance corresponds to the road.

In accordance with the twenty-fifth aspect, the predetermined speed suitable for the state of the road on which the human-powered vehicle travels can be set from the road surface resistances prestored in the storage in which the selected road surface resistance corresponds to the road.

In accordance with a twenty-sixth aspect of the present disclosure, the human-powered vehicle control device according to any one of the first to fourth aspects is configured so that the electronic controller is further configured to vary the predetermined speed as the human-powered vehicle approaches a curve in the road.

In accordance with the twenty-sixth aspect, the predetermined speed can be varied before the human-powered vehicle turns in a case where the probability of the human-powered vehicle turning is high.

In accordance with a twenty-seventh aspect of the present disclosure, in the human-powered vehicle control device according to any one of the fifth, and the eighth to twenty-sixth aspects further comprises storage having first, second and third predetermined speeds prestored as the predetermined speed. The second predetermined speed is lower than the first predetermined speed, and the third predetermined speed differs from the second predetermined speed. The electronic controller is further configured to set the predetermined speed to the third predetermined speed upon determining a braking operation is performed on the human-powered vehicle as the human-powered vehicle approaches a curve in the road or while the human-powered vehicle is in a turning state.

In accordance with the twenty-seventh aspect, the assistance of the propulsion of the human-powered vehicle by the motor is limited in a case where the probability the human-powered vehicle being turned is high and if a braking operation is performed in a case where the human-powered vehicle is in the turning state.

In accordance with a twenty-eighth aspect of the present disclosure, the human-powered vehicle control device according to any one of the first to fourth, seventh and eighth aspects is configured so that the electronic controller includes storage having first, second and third predetermined speeds prestored as the predetermined speed. The second predetermined speed is lower than the first predetermined speed, and a third predetermined speed differs from the second predetermined speed. The electronic controller is further configured to set the predetermined speed to the third predetermined speed upon determining a braking operation is performed on the human-powered vehicle.

In accordance with the twenty-eighth aspect, in a case where the braking operation is performed on the human-powered vehicle, that is, in a case where the user wishes to lower the speed of the human-powered vehicle, the speed of the human-powered vehicle can be rapidly lowered to limit the assistance of the propulsion of the human-powered vehicle by the motor.

A human-powered vehicle control device in accordance with a twenty-ninth aspect of the present disclosure comprises an electronic controller configured to control a motor that assists in propulsion of a human-powered vehicle. The electronic controller is further configured to control the motor to restrict assistance of the propulsion of the human-powered vehicle upon determining a braking operation is performed on the human-powered vehicle while the human-powered vehicle is in a turning state.

In accordance with the twenty-ninth aspect, the assistance of the propulsion of the human-powered vehicle by the motor can be limited in a case where the braking operation is performed during the turning state of the human-powered vehicle.

A human-powered vehicle control device according to the present disclosure can stop the assistance of the propulsion of a human-powered vehicle at a timing suitable for at least one of a state of a human-powered vehicle and a state of a road.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

First Embodiment

Figure 1:
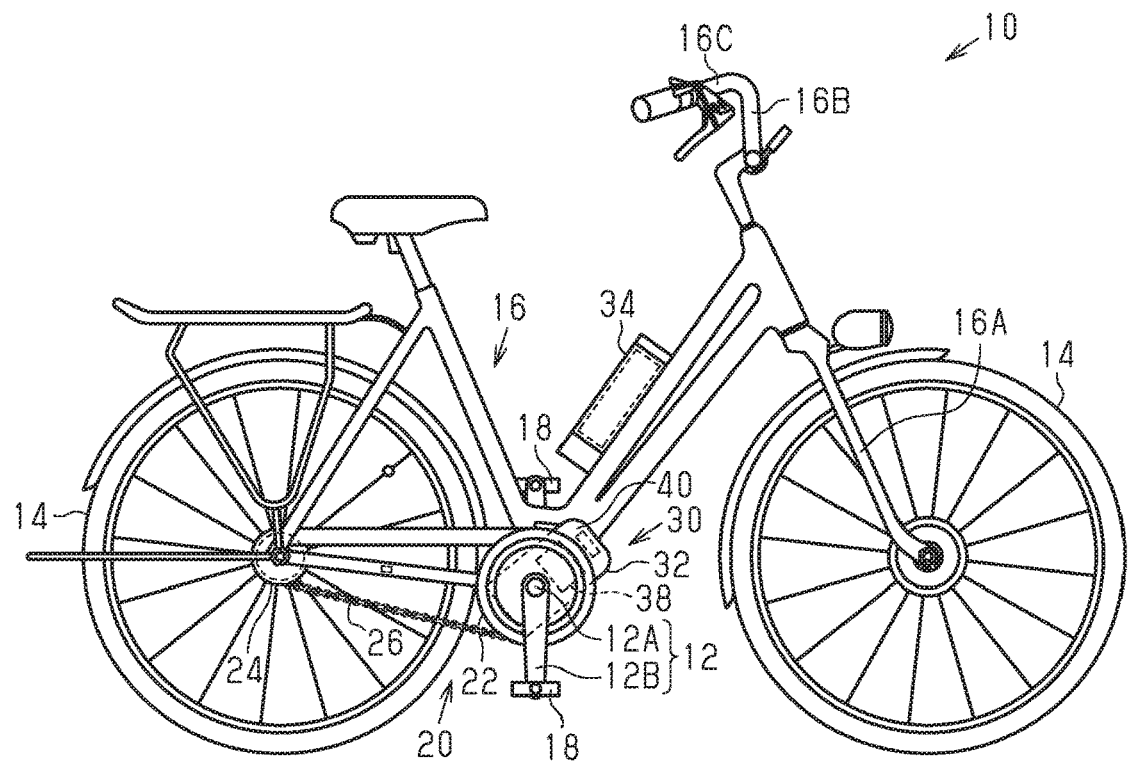
FIG. 1 is a side elevational view of a bicycle including a human-powered vehicle control device according to a first embodiment.

A human-powered vehicle 10 including a human-powered vehicle control device 50 according to a first embodiment will be described with reference to FIG. 1. Hereinafter, the human-powered vehicle control device 50 will be described simply as the control device 50. The control device 50 is provided on the human-powered vehicle 10. The human-powered vehicle 10 is a vehicle that can be driven by at least human drive force. The human-powered vehicle 10 includes, for example, a bicycle. The human-powered vehicle 10 also includes a unicycle and a vehicle having three or more wheels, for example, and the number of wheels is not limited. The bicycle includes, for example, a mountain bike, a road bike, a city bike, a cargo bike, and a recumbent bike. The human-powered vehicle 10 of the embodiment will hereafter be described as a bicycle.

The human-powered vehicle 10 includes a crank 12 and a drive wheel 14. The human-powered vehicle 10 further includes a frame 16. The human drive force H is input to the crank 12. The crank 12 includes a crankshaft 12A rotatable relative to the frame 16 and a pair of crank arms 12B provided on two axial ends of the crankshaft 12A. A pedal 18 is connected to each of the crank arms 12B. The drive wheel 14 is driven by the rotation of the crank 12. The drive wheel 14 is supported by the frame 16. The crank 12 and the drive wheel 14 are connected by a drive mechanism 20. The drive mechanism 20 includes a first rotary body 22 coupled to the crankshaft 12A. The crankshaft 12A and the first rotary body 22 can be coupled by a first one-way clutch. The first one-way clutch is configured so as to rotate the first rotary body 22 forward in a case where the crank 12 rotates forward and not to rotate the first rotary body 22 backward in a case where the crank 12 rotates backward. The first rotary body 22 includes a sprocket, a pulley, or a bevel gear. The drive mechanism 20 further includes a linking member 26 and a second rotary body 24. The linking member 26 transmits the rotational force of the first rotary body 22 to the second rotary body 24. The linking member 26 includes, for example, a chain, a belt, or a shaft.

The second rotary body 24 is connected to the drive wheel 14. The second rotary body 24 includes a sprocket, a pulley, or a bevel gear. It is preferable that a second one-way clutch is provided between the second rotary body 24 and the drive wheel 14. The second one-way clutch is configured so as to cause the drive wheel 14 to rotate forward in a case where the second rotary body 24 rotates forward, and not to cause the drive wheel 14 to rotate backward in a case where the second rotary body 24 rotates backward.

The human-powered vehicle 10 includes a front wheel and a rear wheel. The front wheel is attached to the frame 16 by a front fork 16A. A handlebar 16C is connected to the front fork 16A by a stem 16B. In the following embodiments, the rear wheel will be described as the drive wheel 14 but the front wheel can be the drive wheel 14.

A human-powered vehicle control system 30 includes an electric component 32, a battery 34, and a control device 50. In one example, the electric component 32 includes a motor 36. The electric component 32 includes a motor 36 and a drive circuit 38. Preferably, the motor 36 and the drive circuit 38 are provided on the same housing 40. The housing 40 is provided on the frame 16. The drive circuit 38 controls the electric power supplied from the battery 34 to the motor 36. The drive circuit 38 is connected to the electronic controller 52 of the control device 50 so as to perform communication through a wired or wireless connection. The drive circuit 38 is configured to communicate with the electronic controller 52 through, for example, power line communication (PLC). The drive circuit 38 is configured to communicate with the electronic controller 52 through, for example, serial communication. The drive circuit 38 drives the motor 36 in correspondence with a control signal from the electronic controller 52. The motor 36 assists in propulsion of the human-powered vehicle 10. The motor 36 includes an electric motor. The motor 36 transmits rotation to the front wheel or a transmission path of the human drive force H extending from the pedals 18 to the rear wheel. The motor 36 is provided on the frame 16, the rear wheel, or the front wheel of the human-powered vehicle 10. In one example, the motor 36 is coupled to a power transmission path extending from the crankshaft 12A to the first rotary body 22. Preferably, a one-way clutch is provided on the power transmission path between the motor 36 and the crankshaft 12A so that the motor 36 is not rotated by the rotational force of the crank 12 in a case where the crankshaft 12A is rotated in the direction in which the human-powered vehicle 10 moves forward. The housing 40 provided with the motor 36 and the drive circuit 38 can be provided with components other than the motor 36 and the drive circuit 38 such as a speed reducer that decelerates and outputs the rotation of the motor 36.

The battery 34 includes one or more battery cells. The battery cell includes a rechargeable battery. The battery 34 is provided on the human-powered vehicle 10 and supplies power to other electric parts, such as the motor 36 and the control device 50, which are electrically connected to the battery 34 by a wire. The battery 34 is connected to the electronic controller 52 so as to perform communication through a wired or wireless connection. The battery 34 is configured to communicate with the electronic controller 52 through, for example, PLC. The battery 34 can be attached to the outside of the frame 16 or be at least partially accommodated inside the frame 16.

Figure 2:
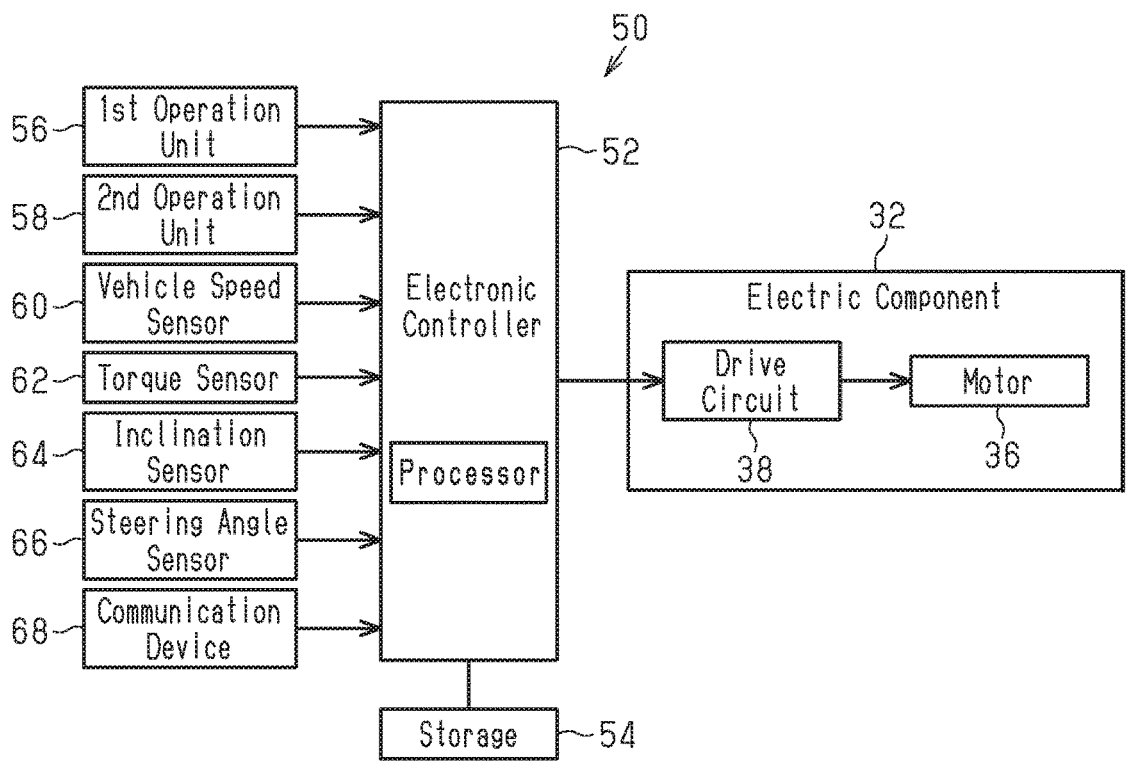
FIG. 2 is a block diagram showing an electrical configuration of the human-powered vehicle control device of FIG. 1.

The control device 50 includes the electronic controller 52. In one example, the control device 50 further includes at least one of a storage 54, a first operation unit 56, a second operation unit 58, a vehicle speed sensor 60, a torque sensor 62, an inclination sensor 64, a steering angle sensor 66, and a communication device 68. FIG. 2 shows an example of a configuration in which the control device 50 includes the storage 54, the first operation unit 56, the second operation unit 58, the vehicle speed sensor 60, the torque sensor 62, the inclination sensor 64, the steering angle sensor 66, and the communication device 68.

The first operation unit 56 is an operation unit capable of inputting the road surface state of the road on which the human-powered vehicle 10 travels. An example of the first operation unit 56 is a cycle computer, which includes at least one user input. The first operation unit 56 is connected to the electronic controller 52 so as to be able to communicate in a wired or wireless manner. The first operation unit 56 outputs to the electronic controller 52 information of the road surface state of the road on which the human-powered vehicle 10 travels, which is the operation information. An example of the information of the road surface state of the road on which the human-powered vehicle 10 travels is the road surface resistance of the road.

The second operation unit 58 is a brake operation unit for braking the human-powered vehicle 10. The second operation unit 58 is provided on the handlebar. The second operation unit 58 is connected to an electric brake device (not shown) that brakes the human-powered vehicle 10 in a wireless or wired manner. The second operation unit 58 is connected to the electronic controller 52 so as to be able to communicate in a wireless or wired manner. The second operation unit 58 outputs information to the electronic controller 52 of a braking operation performed on the human-powered vehicle 10.

The vehicle speed sensor 60 detects the rotational speed of the wheel. The vehicle speed sensor 60 is electrically connected to the electronic controller 52 in a wired or wireless manner. The vehicle speed sensor 60 is connected to the electronic controller 52 so as to perform communication through a wired or wireless connection. The vehicle speed sensor 60 outputs a signal in correspondence with the rotational speed of the wheel to the electronic controller 52. The electronic controller 52 calculates the vehicle speed V of the human-powered vehicle 10 based on the rotational speed of the wheel. The vehicle speed sensor 60 preferably includes a magnetic reed of a reed switch or a Hall element. The vehicle speed sensor 60 can be mounted on a chain stay of the frame 16 to detect a magnet attached to the rear wheel or can be provided on the front fork 16A to detect a magnet attached to the front wheel.

The torque sensor 62 is provided on the housing 40 on which the motor 36 is provided. The torque sensor 62 detects the human drive force H input to the crank 12. The torque sensor 62 is provided, for example, on the power transmission path at the upstream side of the first one-way clutch in. The torque sensor 62 includes a strain sensor, a magnetostrictive sensor, or the like. The strain sensor includes a strain gauge. In a case where the torque sensor 62 includes a strain sensor, the strain sensor is provided on the outer circumferential portion of the rotary body included in the power transmission path. The torque sensor 62 can include a wireless or wired communication unit. The communication unit of the torque sensor 62 is configured to communicate with the electronic controller 52. The torque sensor 62 outputs a signal in correspondence with the human drive force H to the electronic controller 52.

The inclination sensor 64 includes at least one of a gyro sensor and an acceleration sensor, for example. The inclination sensor 64 is provided, for example, on the frame 16 or the housing 40 to detect the inclination in the roll direction of the human-powered vehicle 10. The inclination sensor 64 is connected to the electronic controller 52 so as to be capable of communicating in a wireless or wired manner. The inclination sensor 64 outputs a signal corresponding to the inclination in the roll direction of the human-powered vehicle 10 to the electronic controller 52.

The steering angle sensor 66 includes, for example, a potentiometer. The steering angle sensor 66 is provided, for example, on the head tube to detect a relative rotation angle (handlebar steering angle) between the head tube and a steering column to which the handlebar is connected. The steering angle sensor 66 is connected to the electronic controller 52 so as to be capable of communicating in a wireless or wired manner. The steering angle sensor 66 outputs a signal in correspondence with the handlebar steering angle to the electronic controller 52.

The communication device 68 includes a global positioning system (GPS) receiver and is configured to be connected to the Internet. The communication device 68 acquires at least one of map data for where the human-powered vehicle 10 travels, gradient of the road surface on which the human-powered vehicle 10 travels, and state of the road surface from the GPS and the Internet. The communication device 68 does not have to be connected to the Internet in which case the storage 54 or some other storage included in the communication device 68 stores the map data. The communication device 68 is connected to the electronic controller 52 so as to be capable of communicating in a wireless or wired manner.

The electronic controller 52 includes at least one processor that executes a control program set in advance. The processor is, for example, a central processing unit (CPU) or a micro-processing unit (MPU). The electronic controller 52 can include one or more microcomputers. The electronic controller 52 is preferably a microcomputer that includes one or more processors. The electronic controller 152 is formed of one or more semiconductor chips that are mounted on a printed circuit board. The term "electronic controller" as used herein refers to hardware that executes a software program. The memory or storage 54 stores various control programs and information used for various control processes. The storage 54 is any computer storage device or any computer readable medium with the sole exception of a transitory, propagating signal. The storage 54 includes, for example, a nonvolatile memory and a volatile memory. The nonvolatile memory includes, for example, a Read Only Memory (ROM), a hard disk, and a flash memory. The volatile memory includes, for example, a Random Access Memory (RAM). The electronic controller 52 and the storage 54 are provided, for example, on the housing 40 in which the motor 36 is provided.

The electronic controller 52 controls the electric component 32 of the human-powered vehicle 10. The electronic controller 52 controls the motor 36 that assists in the propulsion of the human-powered vehicle 10 in correspondence with the human drive force H. The electronic controller 52 executes basic control for executing and stopping assistance by the motor 36 in correspondence with the traveling speed (vehicle speed V) of the human-powered vehicle 10. In the basic control, in a case where the human-powered vehicle 10 is less than a predetermined speed VA that is higher than 0 km/h, the electronic controller 52 controls the assistance by the motor 36 in correspondence with the human drive force H. The electronic controller 52 does not assist the propulsion of the human-powered vehicle 10 in a case where the human-powered vehicle 10 is greater than or equal to the predetermined speed VA.

Figure 3:
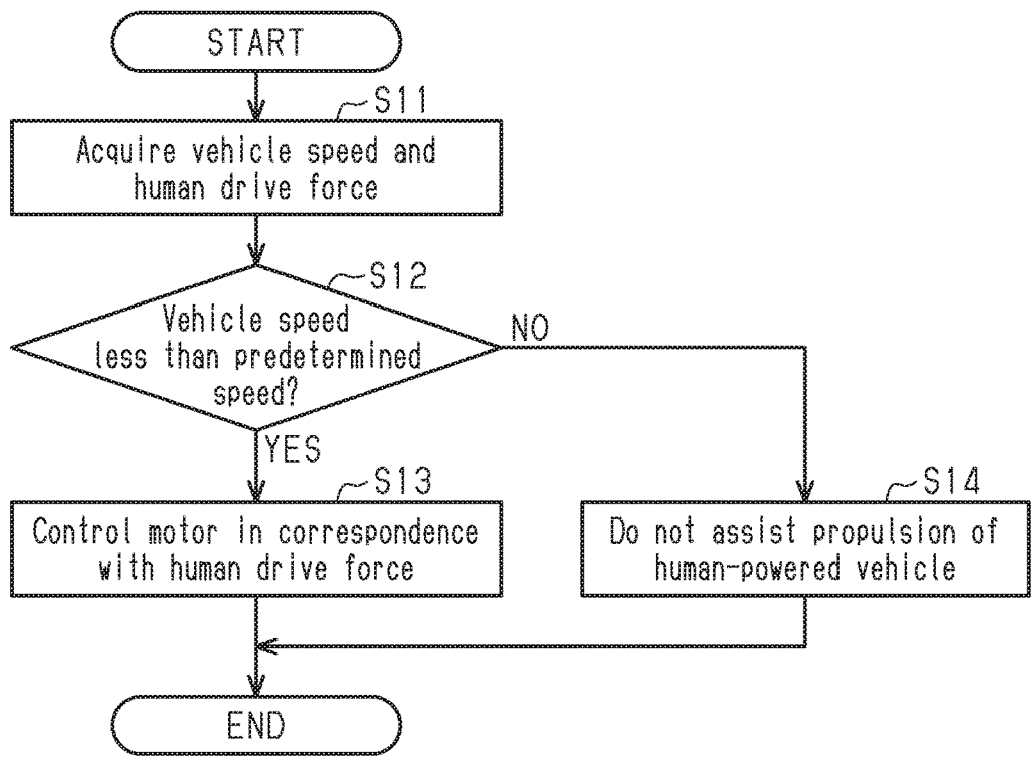
FIG. 3 is a flowchart of a basic control executed by the human-powered vehicle control device.

FIG. 3 is a flowchart showing an example of the basic control. As shown in FIG. 3, the electronic controller 52 acquires the vehicle speed V and the human drive force H in step S11. In step S12, the electronic controller 52 determines whether or not the vehicle speed V is less than the predetermined speed VA. An example of the predetermined speed VA is, for example, 24 km/h, 25 km/h, or 45 km/h. In a case where the vehicle speed V is less than the predetermined speed VA (step S12: YES), the electronic controller 52 controls the motor 36 in correspondence with the acquired human drive force H in step S13. In a case where the vehicle speed V is greater than or equal to the predetermined speed VA (step S12: NO), the electronic controller 52 does not assist the propulsion of the human-powered vehicle 10 in step S14. In one example, the electronic controller 52 does not drive the motor 36 in a case where the human-powered vehicle 10 is traveling at a traveling speed (vehicle speed V) exceeding the predetermined speed VA. In this case, for example, the rotation speed of the motor 36 is 0 rpm. In the basic control of FIG. 3, the human drive force H can be acquired between step S12 and step S13.

Change Control

The electronic controller 52 executes a change control for changing the predetermined speed VA in correspondence with at least one of the state of the human-powered vehicle 10 and the state of the road on which the human-powered vehicle 10 travels. The change control includes a first change control, a second change control, and a third change control. In the first change control, the electronic controller 52 changes the predetermined speed VA in correspondence with the state of the human-powered vehicle 10. In the second change control, the electronic controller 52 changes the predetermined speed VA in correspondence with the state of the road. In the third change control, the electronic controller 52 changes the predetermined speed VA in correspondence with the information of the road in the map data (road is straight or the road is curve). The first change control, the second change control, and the third change control are repeatedly executed at predetermined time intervals.

First Change Control

The state of the human-powered vehicle 10 includes a first state and a second state differing from the first state. The first state is a state in which the traveling speed of the human-powered vehicle 10 can be raised or a state in which the user wishes to raise the traveling speed of the human-powered vehicle 10. The second state is a state in which it is preferable to limit the traveling speed of the human-powered vehicle 10 or a state in which the traveling speed of the human-powered vehicle 10 can be limited.

The state of the human-powered vehicle 10 includes at least one of the state of the traveling speed of the human-powered vehicle 10, the state of the angle of the human-powered vehicle 10, the state of the handlebar steering angle of the human-powered vehicle 10, and the turning state of the human-powered vehicle 10. The angle of the human-powered vehicle 10 includes at least one of a yaw angle, a pitch angle, and a roll angle. In the present embodiment, the roll angle is used as the angle of the human-powered vehicle 10 by the inclination sensor 64.

The electronic controller 52 determines the state of the traveling speed of the human-powered vehicle 10 in correspondence with the information of the vehicle speed V detected by the vehicle speed sensor 60. The electronic controller 52 determines the state of the angle of the human-powered vehicle 10 in correspondence with the information of the inclination in the roll direction of the human-powered vehicle 10 detected by the inclination sensor 64. The electronic controller 52 determines the state of the handlebar steering angle of the human-powered vehicle 10 in correspondence with the information of the handlebar steering angle detected by the steering angle sensor 66. The electronic controller 52 determines the turning state of the human-powered vehicle 10 in correspondence with at least one of the angle of the human-powered vehicle 10 and the handlebar steering angle of the human-powered vehicle 10 and the traveling speed of the human-powered vehicle 10. In one example, the electronic controller 52 determines the turning state of the human-powered vehicle 10 in correspondence with the information of the inclination in the roll direction of the human-powered vehicle 10 detected by the inclination sensor 64, the information of the handlebar steering angle detected by the steering angle sensor 66, and the information of the vehicle speed V detected by the vehicle speed sensor 60.

The first state and the second state serving as states of the human-powered vehicle 10 includes the first state and the second state serving as the states of the traveling speed of the human-powered vehicle 10, the first state and the second state serving as the states of the angle of the human-powered vehicle 10, the first state and the second state serving as the states of the handlebar steering angle of the human-powered vehicle 10, and the first state and the second state serving as the turning states of the human-powered vehicle 10.

In the first change control, the electronic controller 52 sets the predetermined speed VA to a first predetermined speed VA1 in the first state and sets the predetermined speed VA to a second predetermined speed VA2 that is lower than the first predetermined speed VA1 in the second state. The first predetermined speed VA1 is a fixed value. The second predetermined speed VA2 is a variable value. In the case of the first state, the electronic controller 52 drives the motor 36 in correspondence with the human drive force H in a case where the traveling speed of the human-powered vehicle 10 is less than the first predetermined speed VA1, and does not assist the propulsion of the human-powered vehicle 10 in a case where the traveling speed of the human-powered vehicle 10 is greater than or equal to the first predetermined speed VA1. In the case of the second state, the electronic controller 52 drives the motor 36 in correspondence with the human drive force H in a case where the traveling speed of the human-powered vehicle 10 is less than the second predetermined speed VA2, and does not assist the propulsion of the human-powered vehicle 10 in a case where the traveling speed of the human-powered vehicle 10 is greater than or equal to the second predetermined speed VA2.

Figure 4:
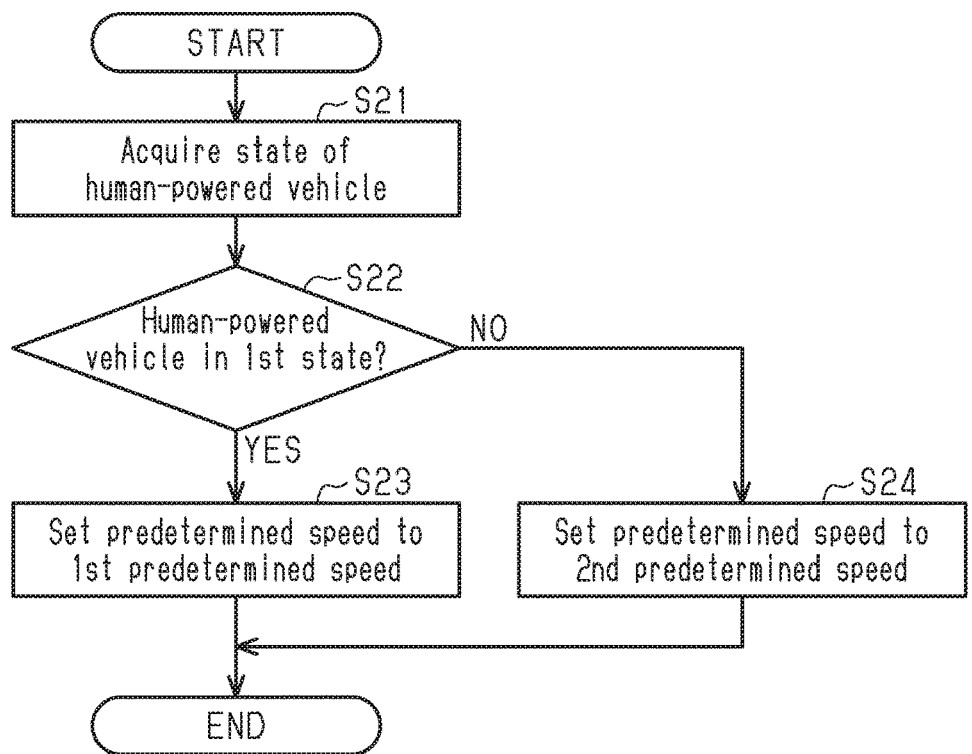
FIG. 4 is a flowchart of a first change control executed by the human-powered vehicle control device.

FIG. 4 is a flowchart showing an example of the first change control. As shown in FIG. 4, the electronic controller 52 acquires the state of the human-powered vehicle 10 in step S21. The electronic controller 52 determines whether or not the state of the human-powered vehicle 10 is in the first state in step S21. In a case where the state of the human-powered vehicle 10 is in the first state (step S22: YES), the electronic controller 52 sets the predetermined speed VA to the first predetermined speed VA1 in step S23. An example of the first predetermined speed VA1 is 24 km/h or 25 km/h. In a case where the state of the human-powered vehicle 10 is in the second state (step S22: NO), the electronic controller 52 sets the predetermined speed VA to the second predetermined speed VA2 in step S24.

The second predetermined speed VA2 is set by, for example, the following first to third setting methods. In the first setting method, the electronic controller 52 sets the traveling speed of the human-powered vehicle 10 at the time point in which the human-powered vehicle 10 enters the second state to the second predetermined speed VA2 in a case where the human-powered vehicle 10 enters the second state. That is, the electronic controller 52 sets the vehicle speed V detected by the vehicle speed sensor 60 to the second predetermined speed VA2 at a time point in which the human-powered vehicle 10 enters the second state.

In the second setting method, in a case where the human-powered vehicle 10 enters the second state, the electronic controller 52 sets an average value of the traveling speed of the human-powered vehicle 10 in a period from the time point in which the human-powered vehicle 10 starts the second state until a predetermined time before to the second predetermined speed VA2. The electronic controller 52 calculates the average value of the vehicle speed V detected in the period from the vehicle speed V detected by the vehicle speed sensor 60 at the time the human-powered vehicle 10 entered the second state to the predetermined sampling period of the vehicle speed sensor 60. The period from the vehicle speed V detected by the vehicle speed sensor 60 at the time point in which the human-powered vehicle 10 entered the second state to the predetermined sampling period of the vehicle speed sensor 60 is a period from immediately before the human-powered vehicle 10 enters the second state until the human-powered vehicle 10 reaches the second state. The period can be changed to any period.

In the third setting method, in a case where the human-powered vehicle 10 enters the second state, the electronic controller 52 sets an average value of the traveling speed of the human-powered vehicle 10 in a case the human-powered vehicle 10 traveled over a distance from a predetermined location to a location where the human-powered vehicle 10 entered the second state to the second predetermined speed VA2. The electronic controller 52 can acquire the distance from the predetermined location to the location where the human-powered vehicle 10 entered the second state based on the map data of the communication device 68. The electronic controller 52 sets the average value of the plurality of vehicle speeds V detected by the vehicle speed sensor 60 to the second predetermined speed VA2 in the distance from the predetermined location to the location where the human-powered vehicle 10 entered the second state.

Specific examples of the first change control will now be described with reference to FIGS. 5 to 7. In the first example of the first change control, the angle of the human-powered vehicle 10 is used as the state of the human-powered vehicle 10. The electronic controller 52 varies the predetermined speed VA in correspondence with the angle of the human-powered vehicle 10. Specifically, the electronic controller 52 sets the predetermined speed VA to the first predetermined speed VA1 in a case where the roll angle serving as the angle of the human-powered vehicle 10 is less than the first roll angle, and sets the predetermined speed to the second predetermined speed VA2 that is lower than the first predetermined speed VA1 in a case where the roll angle is greater than or equal to the first roll angle.

Figure 5:
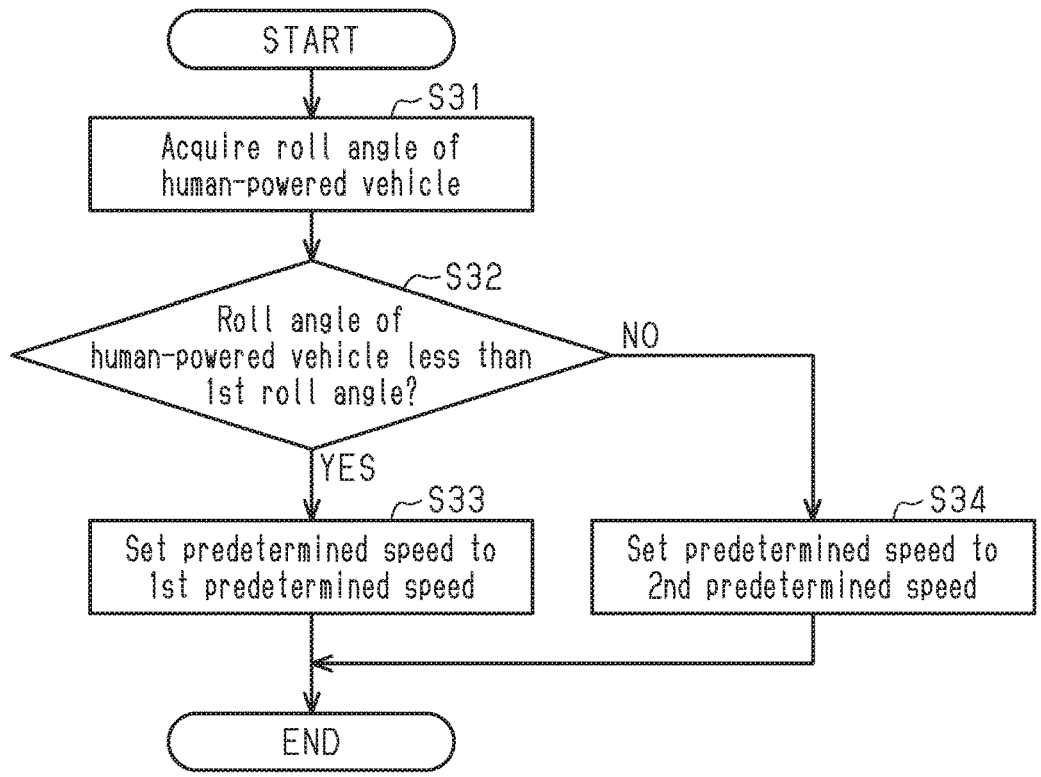
FIG. 5 is a flowchart of a first example of the first change control executed by the human-powered vehicle control device.

FIG. 5 is a flowchart showing the first example of the first change control. As shown in FIG. 5, the electronic controller 52 acquires the roll angle of the human-powered vehicle 10 as the angle of the human-powered vehicle 10 in step S31. Information of the roll angle of the human-powered vehicle 10 detected by the inclination sensor 64 is used as the roll angle of the human-powered vehicle 10. The electronic controller 52 determines whether or not the roll angle is less than the first roll angle in step S32. The first roll angle is a value for determining whether the state of the human-powered vehicle 10 is the first state or the second state based on the state of the angle of the human-powered vehicle 10. The first roll angle is set in advance through experiments or the like. In a case where the roll angle is less than the first roll angle (step S32: YES), the electronic controller 52 sets the predetermined speed VA to the first predetermined speed VA1 in step S33. In a case where the roll angle is greater than or equal to the first roll angle (step S32: NO), the electronic controller 52 sets the predetermined speed VA to the second predetermined speed VA2 in step S34.

In the second example of the first change control, the handlebar steering angle of the human-powered vehicle 10 is used as the state of the human-powered vehicle 10. The electronic controller 52 sets the predetermined speed VA to the first predetermined speed VA1 in a case where the handlebar steering angle of the human-powered vehicle 10 is less than the first steering angle, and sets the predetermined speed VA to the second predetermined speed VA2 in a case where the handlebar steering angle is greater than or equal to the first steering angle.

Figure 6:
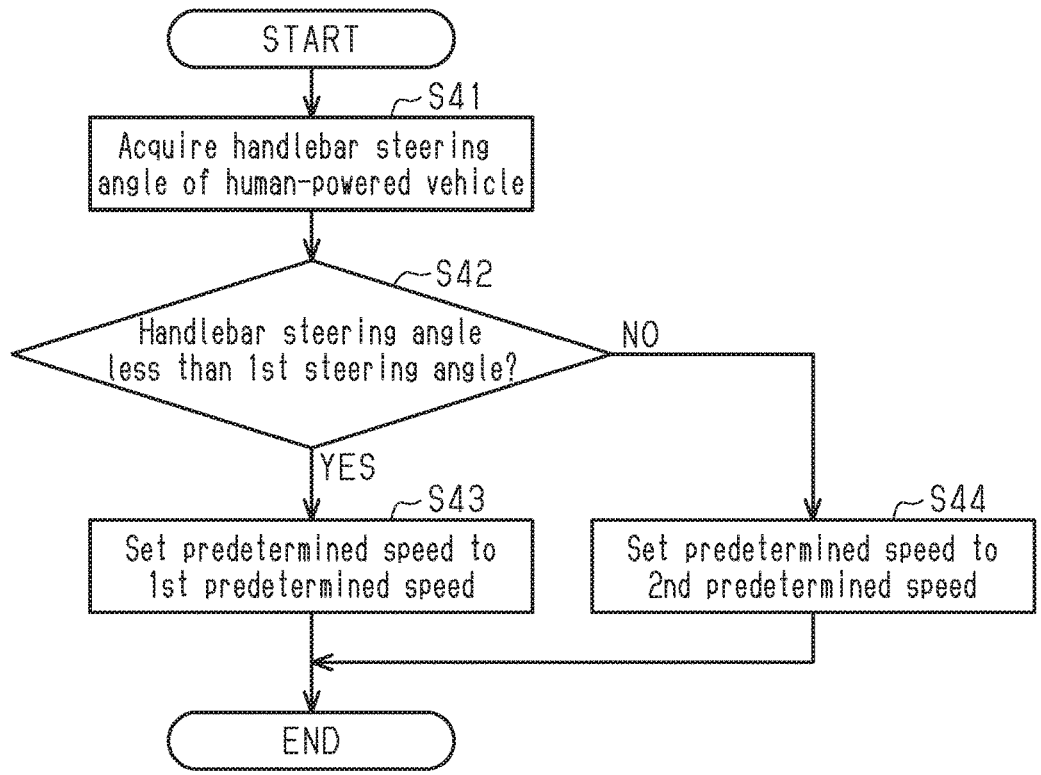
FIG. 6 is a flowchart of a second example of the first change control executed by the human-powered vehicle control device.

FIG. 6 is a flowchart showing the second example of the first change control. As shown in FIG. 6, the electronic controller 52 acquires the handlebar steering angle of the human-powered vehicle 10 in step S41. Information of the handlebar steering angle of the human-powered vehicle 10 detected by the steering angle sensor 66 is used as the handlebar steering angle of the human-powered vehicle 10. The electronic controller 52 determines whether or not the handlebar steering angle is less than the first steering angle in step S42. The first steering angle is a value for determining whether the state of the human-powered vehicle 10 is the first state or the second state based on the state of the angle of the human-powered vehicle 10. The first steering angle is set in advance through experiments or the like. In a case where the handlebar steering angle is less than the first steering angle (step S42: YES), the electronic controller 52 sets the predetermined speed VA to the first predetermined speed VA1 in step S43. In a case where the handlebar steering angle is greater than or equal to the first steering angle (step S42: NO), the electronic controller 52 sets the predetermined speed VA to the second predetermined speed VA2 in step S44.

In the third example of the first change control, a plurality of states, that is, at least one of the angle of the human-powered vehicle 10 and the handlebar steering angle of the human-powered vehicle 10 and the traveling speed of the human-powered vehicle 10 are used as the state of the human-powered vehicle 10. The electronic controller 52 varies the predetermined speed VA in correspondence with at least one of the handlebar steering angle of the human-powered vehicle 10 and the angle of the human-powered vehicle 10 and the traveling speed of the human-powered vehicle 10. The electronic controller 52 determines the turning state of the human-powered vehicle 10 in correspondence with at least one of the handlebar steering angle of the human-powered vehicle 10 and the angle of the human-powered vehicle 10 and the traveling speed of the human-powered vehicle 10. The electronic controller 52 varies the predetermined speed VA in a case where the human-powered vehicle 10 is in the turning state.

As a method of varying the predetermined speed VA, there are, for example, first to third varying methods. In the first varying method, in a case where the human-powered vehicle 10 is in the turning state, the electronic controller 52 sets the predetermined speed VA to the traveling speed of the human-powered vehicle 10 at a time point in which the turning state of the human-powered vehicle 10 started. That is, in a case where the human-powered vehicle 10 is in the turning state, the electronic controller 52 sets the second predetermined speed VA2 to the traveling speed of the human-powered vehicle 10 at a time point in which the turning state of the human-powered vehicle 10 started. As the traveling speed of the human-powered vehicle 10 at the time point in which the turning state of the human-powered vehicle 10 started, the electronic controller 52 acquires, for example, the traveling speed of the human-powered vehicle 10 at the time point immediately before the human-powered vehicle 10 enters the curve based on the map data from the communication device 68.

In the second varying method, in a case where the human-powered vehicle 10 is in the turning state, the electronic controller 52 sets the predetermined speed VA to an average value of the traveling speed of the human-powered vehicle 10 for a period from a time point in which the turning state of the human-powered vehicle 10 started until a predetermined time. That is, in a case where the human-powered vehicle 10 is in the turning state, the electronic controller 52 sets the second predetermined speed VA2 to an average value of the traveling speed of the human-powered vehicle 10 for a period from the time point in which the turning state of the human-powered vehicle 10 started until a predetermined time. The electronic controller 52 calculates the average value of the vehicle speed V detected in the period from the vehicle speed V detected by the vehicle speed sensor 60 at the time point in which the turning state of the human-powered vehicle 10 started to a predetermined sampling period of the vehicle speed sensor 60. The period from the vehicle speed V detected by the vehicle speed sensor 60 at the time point in which the turning state of the human-powered vehicle 10 started to the predetermined sampling period of the vehicle speed sensor 60 is a period from immediately before the human-powered vehicle 10 enters the curve until the human-powered vehicle 10 enters the curve.

In the third varying method, in a case where the human-powered vehicle 10 is in the turning state, the electronic controller 52 sets an average value of the traveling speed of the human-powered vehicle 10 for a case where the human-powered vehicle 10 travels over a distance from a predetermined location to a location where the human-powered vehicle 10 starts the turning state to the predetermined speed VA. That is, in the case where the human-powered vehicle 10 is in the turning state, the electronic controller 52 sets an average value of the traveling speed of the human-powered vehicle 10 for a case where the human-powered vehicle 10 travels over a distance from the predetermined location to the location where the human-powered vehicle 10 starts the turning state to the second predetermined speed VA2. The electronic controller 52 can acquire the distance from the predetermined location to the location where the human-powered vehicle 10 starts the turning state based on the map data of the communication device 68. The electronic controller 52 sets the average value of the plurality of vehicle speeds V detected by the vehicle speed sensor 60 as the second predetermined speed VA2 at the distance from the predetermined location to the location where the human-powered vehicle 10 starts the turning state.

Figure 7:
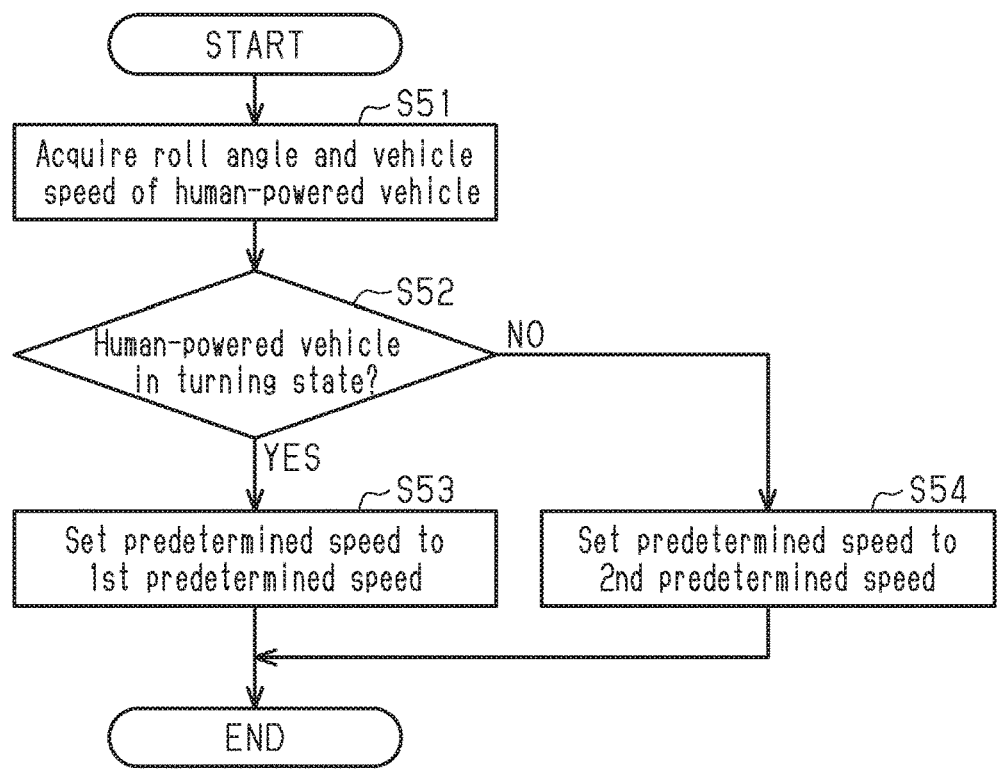
FIG. 7 is a flowchart of a third example of the first change control executed by the human-powered vehicle control device.

FIG. 7 is a flowchart showing the third example of the first change control. As shown in FIG. 7, the electronic controller 52 acquires the roll angle serving as the angle of the human-powered vehicle 10 and the vehicle speed V serving as the traveling speed of the human-powered vehicle 10 in step S51. Information of the roll angle of the human-powered vehicle 10 detected by the inclination sensor 64 is used as the roll angle of the human-powered vehicle 10, and information of the traveling speed of the human-powered vehicle 10 detected by the vehicle speed sensor 60 is used as the vehicle speed V of the human-powered vehicle 10.

The electronic controller 52 determines whether or not the human-powered vehicle 10 is in the turning state in step S52. For example, the electronic controller 52 determines that the human-powered vehicle 10 is in the turning state in a case where the roll angle is greater than or equal to the first roll angle and the vehicle speed V is greater than or equal to the first speed. The electronic controller 52 determines that the human-powered vehicle 10 is not in the turning state in a case where the roll angle is less than the first roll angle or the vehicle speed V is less than the first speed.

In a case where the human-powered vehicle 10 is in the turning state (step S52: YES), the electronic controller 52 sets the predetermined speed VA to the second predetermined speed VA2 in step S53. In a case where the human-powered vehicle 10 is not in the turning state (step S52: NO), the electronic controller 52 sets the predetermined speed VA to the first predetermined speed VA1 in step S54.

Second Change Control

In the second change control, the state of the road surface of the road on which the human-powered vehicle 10 travels is used. As the state of the road surface of the road, information of the state of the road surface of the road operated by the first operation unit 56 is used. An example of the information of the state of the road surface of the road is a road surface resistance value of the road. In the second change control, the electronic controller 52 varies the predetermined speed VA in correspondence with the road surface resistance of the road. The electronic controller 52 has a plurality of road surface resistance values that are selectable in correspondence with the road. The plurality of road surface resistance values can be stored in, for example, the storage 54. The road can be, for example, one of on-road and off-road. On-road refers to a road of which the surface has a small unevenness like a paved road and of which the road surface resistance value is small. Off-road refers to a road of which the surface has a large unevenness like a rocky road or a dirt road and of which the road surface resistance value is large. The electronic controller 52 has a road surface resistance value corresponding to the on-road and a road surface resistance value corresponding to the off-road. The user operates the first operation unit 56 to select the road surface resistance value corresponding to the on-road or the road surface resistance value corresponding to the off-road. The selection of the road surface resistance value corresponding to the on-road and the road surface resistance value corresponding to the off road by the first operation unit 56 is preferably performed while the traveling of the human-powered vehicle 10 is stopped. The user can select the road surface resistance value corresponding to the on-road and the road surface resistance value corresponding to the off-road by the first operation unit 56 while riding the human-powered vehicle 10.

Figure 8:
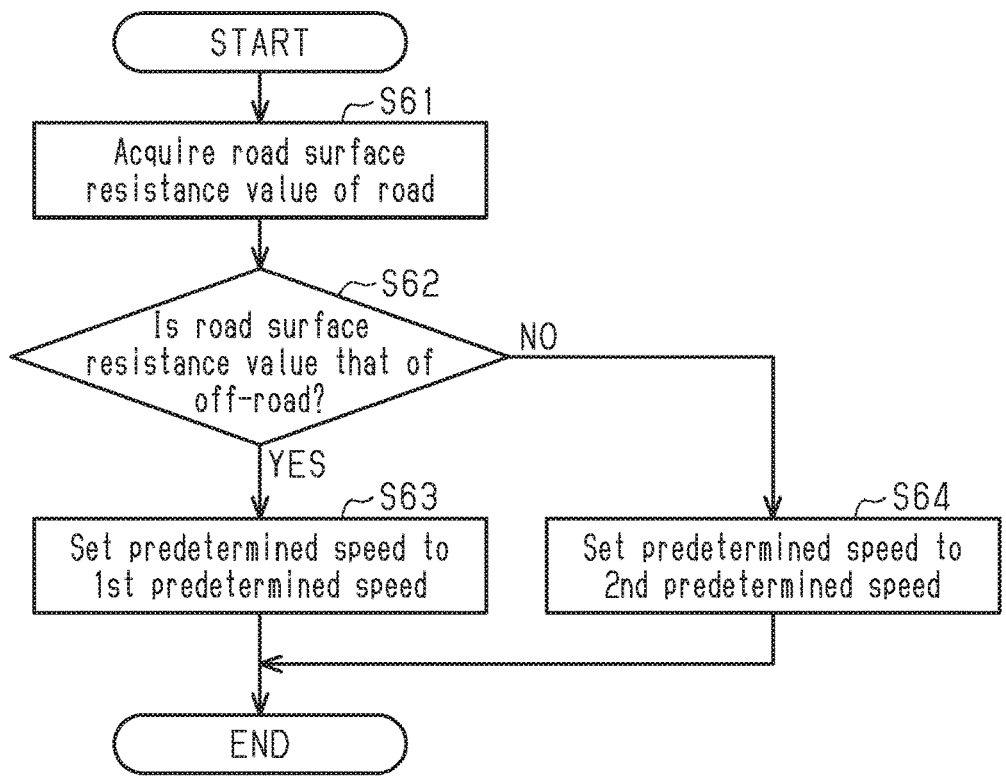
FIG. 8 is a flowchart of a second change control executed by the human-powered vehicle control device.

FIG. 8 is a flowchart showing an example of the second change control. As shown in FIG. 8, the electronic controller 52 acquires the road surface resistance value of the road in step S61. The electronic controller 52 sets the road surface resistance value of the road selected by the first operation unit 56 as the road surface resistance value of the road on which the human-powered vehicle 10 travels.

The electronic controller 52 determines whether or not the road surface resistance value is the road surface resistance value of off-road in step S62. In a case where the road surface resistance value is the road surface resistance value of off-road (step S62: YES), the electronic controller 52 sets the predetermined speed VA to the second predetermined speed VA2 in step S63. In a case where the road surface resistance value is not the road surface resistance value of off-road (step S62: NO), for example, in a case where the road surface resistance value is the road surface resistance value of the on-road, the electronic controller 52 sets the predetermined speed VA to the first predetermined speed VA1 in step S64.

Third Change Control

In the third change control, the road includes a curve, and the electronic controller 52 varies the predetermined speed VA in a case where the human-powered vehicle 10 approaches the curve.

Figure 9:
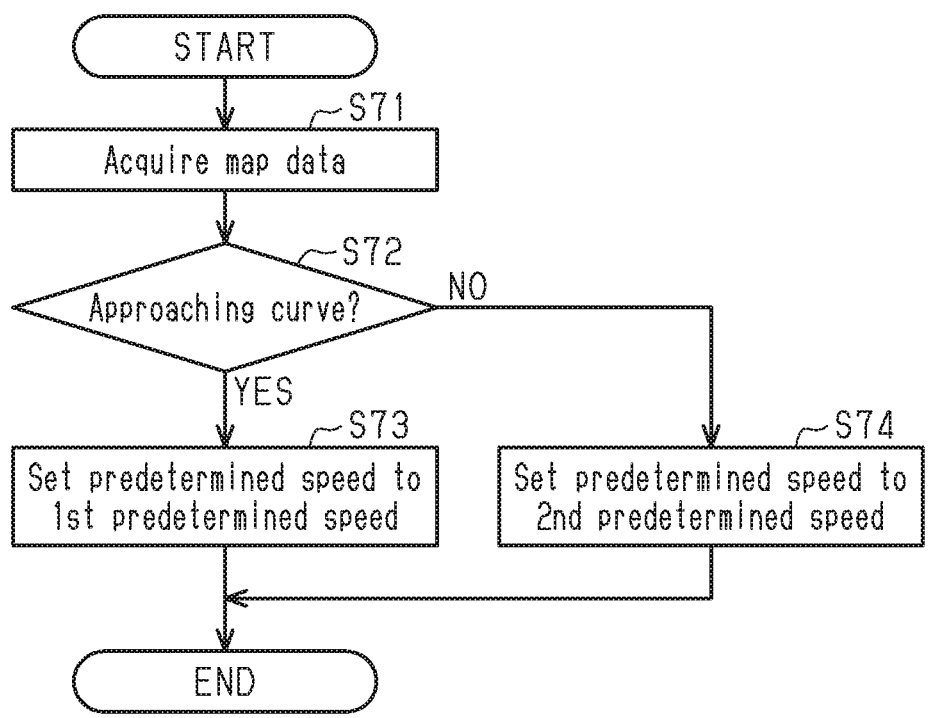
FIG. 9 is a flowchart of a third change control executed by the human-powered vehicle control device.

FIG. 9 is a flowchart showing an example of the third change control. As shown in FIG. 9, the electronic controller 52 acquires the map data in step S71. The electronic controller 52 can recognize information (road straight or curve) of the road on which the current human-powered vehicle 10 is traveling by acquiring the map data from the communication device 68.

The electronic controller 52 determines whether or not the human-powered vehicle 10 is approaching a curve in step S72. For example, in a case where a curve is present ahead of the traveling human-powered vehicle 10 and the curve is separated by a predetermined distance from the human-powered vehicle 10, the electronic controller 52 determines that the human-powered vehicle 10 is approaching a curve. An example of the predetermined distance is two meters.

In a case where the human-powered vehicle 10 is approaching a curve (step S72: YES), the electronic controller 52 sets the predetermined speed VA to the second predetermined speed VA2 in step S73. In a case where the human-powered vehicle 10 is not approaching a curve (step S72: NO), the electronic controller 52 sets the predetermined speed VA to the first predetermined speed VA1 in step S74.

The electronic controller 52 can execute at least one of the first change control, the second change control, and the third change control. In a case where more than one of the first change control, the second change control, and the third change control are executed, the electronic controller 52 can execute the multiple change controls simultaneously or can execute the multiple change controls at different times. In addition, in a case of executing where multiple change controls are executed, the electronic controller 52 can repeat the change controls in cycles that are the same for all of the change controls or repeat the change controls in cycles that differ between the change controls. In a case where the electronic controller 52 executes multiple change controls and sets the predetermined speed VA to the second predetermined speed VA2 in any one of the change controls, priority is given to the setting of the predetermined speed VA to the second predetermined speed VA2 even if another change control sets the predetermined speed VA to the first predetermined speed VA1.

Second Embodiment

The control device 50 according to a second embodiment will now be described with reference to FIG. 10. The control device 50 of the present embodiment differs from the control device 50 of the first embodiment in the contents of the change control. In the description hereafter, same reference numerals are given to those components that are the same as the corresponding components of the human-powered vehicle 10 in accordance with the first embodiment. Such components will not be described in detail.

The electronic controller 52 of the control device 50 in accordance with the present embodiment executes a change control of varying the predetermined speed VA during at least part of a period from a time point in which the turning state of the human-powered vehicle 10 started until a time point in which the turning state ended. In one example, in the change control, the electronic controller 52 varies the predetermined speed VA in correspondence with a stable state of the human-powered vehicle 10 in a case where the human-powered vehicle 10 is in the turning state. The stable state includes a state in which the human-powered vehicle 10 is oversteering in the turning state, a state in which the human-powered vehicle is understeering in the turning state, and a stable traveling state in which the oversteering or the understeering has been reduced. In the change control, the electronic controller 52 calculates the stable state of the human-powered vehicle 10 in correspondence with the traveling speed of the human-powered vehicle 10 and at least one of the handlebar steering angle of the human-powered vehicle 10, the angle of the human-powered vehicle 10, and the wheelbase of the human-powered vehicle 10. The electronic controller 52 varies the predetermined speed VA based on the stable state. After the human-powered vehicle 10 ends the turning state, the electronic controller 52 varies the predetermined speed VA, which has been changed in the turning state, to the predetermined speed VA before the change.

The electronic controller 52 performs the determination of the oversteering state, the understeering state, and the stable traveling state in the following manner. The electronic controller 52 uses a first estimated radius RC1, which is a turning radius in a case where the human-powered vehicle 10 turns in a state immediately before entering the turning state, and a second estimated radius RC2, which is a turning radius of the human-powered vehicle 10 during turning state, to determine whether or not the human-powered vehicle 10 is in the stable traveling state. Specifically, in a case where the first estimated radius RC1 and the second estimated radius RC2 are equal to each other, the electronic controller 52 determines that the human-powered vehicle 10 is in the stable traveling state.

A method of calculating the first estimated radius RC1 and the second estimated radius RC2 will now be described. Generally, in a case where the turning state of the human-powered vehicle 10 is a state in which the human-powered vehicle 10 is performing cornering, the human-powered vehicle 10 is sufficiently decelerated before entering the curve (corner) of the road, a constant speed is maintained without accelerating or decelerating during cornering, and then the human-powered vehicle 10 is accelerated at a timing exiting the curve (corner). The ideal speed during the cornering based on the operation of such a human-powered vehicle 10 is set as an assist upper limit speed (predetermined speed VA).

The assist upper limit speed (predetermined speed VA) for entering a curve is expressed by equation 1.

Equation 1

$$v_{lim} = \sqrt{\mu g R} \quad (1)$$

In the equation, "$v_{lim}$," is the assist upper limit speed (predetermined speed VA), "$\mu$" is the road surface resistance value, and "g" is the gravitational acceleration. Generally, the rider decelerates the human-powered vehicle 10 so that the speed becomes lower than or equal to the assist upper limit speed $v_{lim}$, immediately before entering the curve. The first estimated radius RC 1 can be calculated from the above equation 1. As can be understood from equation 1, the first estimated radius RC1 is the turning radius in a case where the human-powered vehicle 10 is performing cornering at the ideal speed.

In addition, the second estimated radius RC2 can be calculated from the inclination sensor 64 and the vehicle speed sensor 60 in a case where the human-powered vehicle 10 is performing cornering.

The second estimated radius RC2 is expressed by equation 2.

Equation 2

$$R = \frac{v^2 \tan\theta}{g} \quad (2)$$

In the equation, "v" is the traveling speed of the human-powered vehicle 10, and "$\theta$" is the roll angle.

In a case where the first estimated radius RC1 and the second estimated radius RC2 differ from each other, the electronic controller 52 determines whether the human-powered vehicle 10 is in an oversteering state or an understeering state based on the stability factor, which is the steering characteristic of the human-powered vehicle 10.

The stability factor is expressed by equation 3.

Equation 3

$$K_\delta = \delta \frac{\pi R}{180 l v^2} - 1 \quad (3)$$

In the equation, "$K\delta$" is a stability factor, "l" is a wheelbase, and "$\delta$" is a handlebar steering angle.

A method for varying the predetermined speed VA will now be described. The electronic controller 52 varies the predetermined speed VA so that the stable state of the human-powered vehicle 10 approaches the stable traveling state. Specifically, the electronic controller 52 lowers the predetermined speed VA in a case where the stable state is in an understeering state. The electronic controller 52 raises the predetermined speed VA in a case where the stable state is in an oversteering state. The electronic controller 52 does not vary the predetermined speed VA in a case where the stable state is in the stable traveling state.

Specifically, the electronic controller 52 varies the predetermined speed VA so that the stability factor $K\delta$ in the above equation 3 becomes 0. In this case, the predetermined speed VA corresponds to "v" in the above equation 3. In a case where the stable state is in the understeering state, since the stability factor $K\delta$ is a negative value, the stability factor $K\delta$ approaches 0 by lowering "v" in the above equation 3, that is, by lowering the predetermined speed VA. In a case where the stable state is in the oversteering state, since the stability factor $K\delta$ is a positive value, the stability factor $K\delta$ approaches 0 by raising "v" in the above equation 3, that is, by raising the predetermined speed VA. In a case where the stable state is in the stable traveling state, since the stability factor $K\delta$ is 0, "v" in the above equation 3 is not varied, that is, the predetermined speed VA is not varied.

Figure 10:
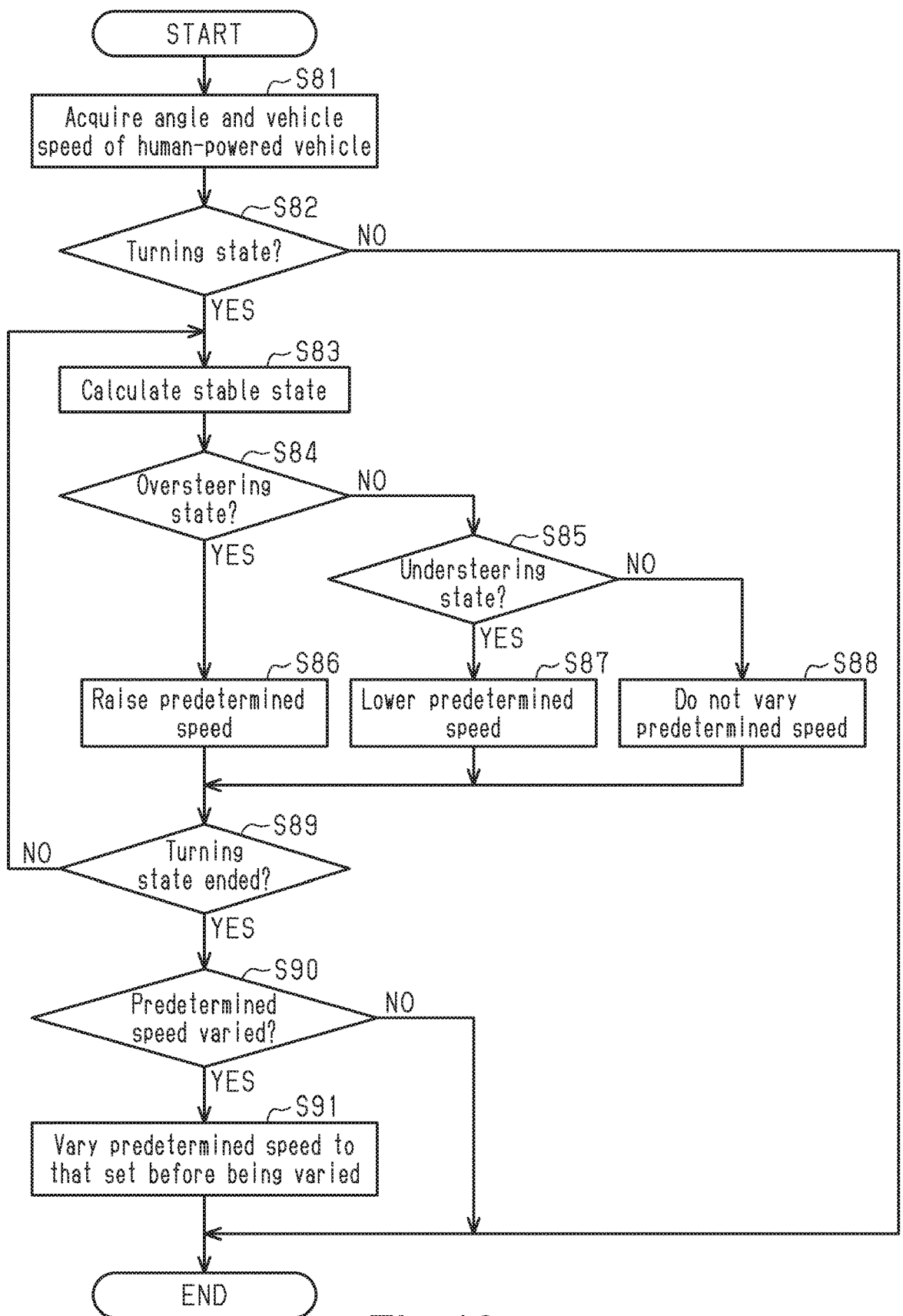
FIG. 10 is a flowchart of change control executed by the human-powered vehicle control device according to a second embodiment.

FIG. 10 is a flowchart showing an example of the change control according to the present embodiment. As shown in FIG. 10, the electronic controller 52 acquires the angle and the vehicle speed V of the human-powered vehicle 10 in step S81. In step S82, the electronic controller 52 determines whether or not the human-powered vehicle 10 is in a turning state. Step S81 and step S82 are the same as step S51 and step S52 shown in FIG. 7.

In a case where the human-powered vehicle 10 is not in the turning state (step S82: NO), the electronic controller 52 temporarily ends the process. In a case where the human-powered vehicle 10 is in the turning state (step S82: YES), the electronic controller 52 calculates the stable state in step S83. Specifically, the electronic controller 52 calculates the stability factor Kδ as the stable state.

In step S84 and step S85, the electronic controller 52 determines the stable state (oversteering state, understeering state, and stable traveling state) of the human-powered vehicle 10. The electronic controller 52 determines the stable state in correspondence with the magnitude of the stability factor Kδ. Specifically, the electronic controller 52 determines whether or not the human-powered vehicle 10 is in an oversteering state in step S84. In step S85, the electronic controller 52 determines whether or not the human-powered vehicle 10 is in the understeering state.

In a case where the stable state is an oversteering state (step S84: YES), that is, in a case where the stability factor Kδ is a positive value, the electronic controller 52 raises the predetermined speed VA in step S86. In a case where the stable state is the understeering state (step S84: NO and step S85: YES), that is, in a case where the stability factor Kδ is a negative value, the electronic controller 52 lowers the predetermined speed VA in step S87. In a case where the stable state is the stable traveling state (step S84: NO and step S85: NO), that is, in a case where the stability factor Kδ is 0, the electronic controller 52 does not vary the predetermined speed VA in step S88.

Then, in step S89, the electronic controller 52 determines whether or not the human-powered vehicle 10 has ended the turning state. For example, in a case where at least one of the case where the roll angle is less than the first roll angle and the case where the handlebar steering angle is less than the first steering angle is satisfied, the electronic controller 52 determines that the human-powered vehicle 10 has ended the turning state.

In a case where the human-powered vehicle 10 has not ended the turning state (step S89: NO), the electronic controller 52 proceeds to step S83. In a case where the human-powered vehicle 10 has ended the turning state (step S89: YES), the electronic controller 52 determines whether or not the predetermined speed VA is varied in step S90.

In a case where the predetermined speed VA has been varied (step S90: YES), the electronic controller 52 in step S91 varies the predetermined speed VA to the predetermined speed VA that was set before the varying. An example of the predetermined speed VA before the varying is the predetermined speed VA set by the electronic controller 52 immediately before the human-powered vehicle 10 enters the turning state. In a case where the predetermined speed VA has not been varied (step S90: NO), that is, in a case where the predetermined speed VA was not varied while the human-powered vehicle 10 was is in the turning state, the electronic controller 52 temporarily ends the process.

Third Embodiment

The control device 50 of a third embodiment will now be described with reference to FIG. 11. The control device 50 of the present embodiment differs from the control device 50 of the first embodiment in the contents of the change control. In the description hereafter, same reference numerals are given to those components that are the same as the corresponding components of the human-powered vehicle 10 in accordance with the first embodiment. Such components will not be described in detail.

The change control of the present embodiment is a control in which the braking operation of the human-powered vehicle 10 at the time the human-powered vehicle 10 is in a turning state is added to the determination condition in the third change control of the first embodiment. As the predetermined speed VA, the electronic controller 52 of the control device 50 of the present embodiment includes the first predetermined speed VA1, the second predetermined speed VA2 that is lower than the first predetermined speed VA1, and the third predetermined speed VA3 that differs from the second predetermined speed VA2. The electronic controller 52 sets the predetermined speed to the third predetermined speed VA3 in a case where the human-powered vehicle 10 approaches the curve or in a case where the human-powered vehicle 10 is undergoing a braking operation during a turning state of the human-powered vehicle 10. In one example, the third predetermined speed VA3 is lower than the second predetermined speed VA2.

Figure 11:
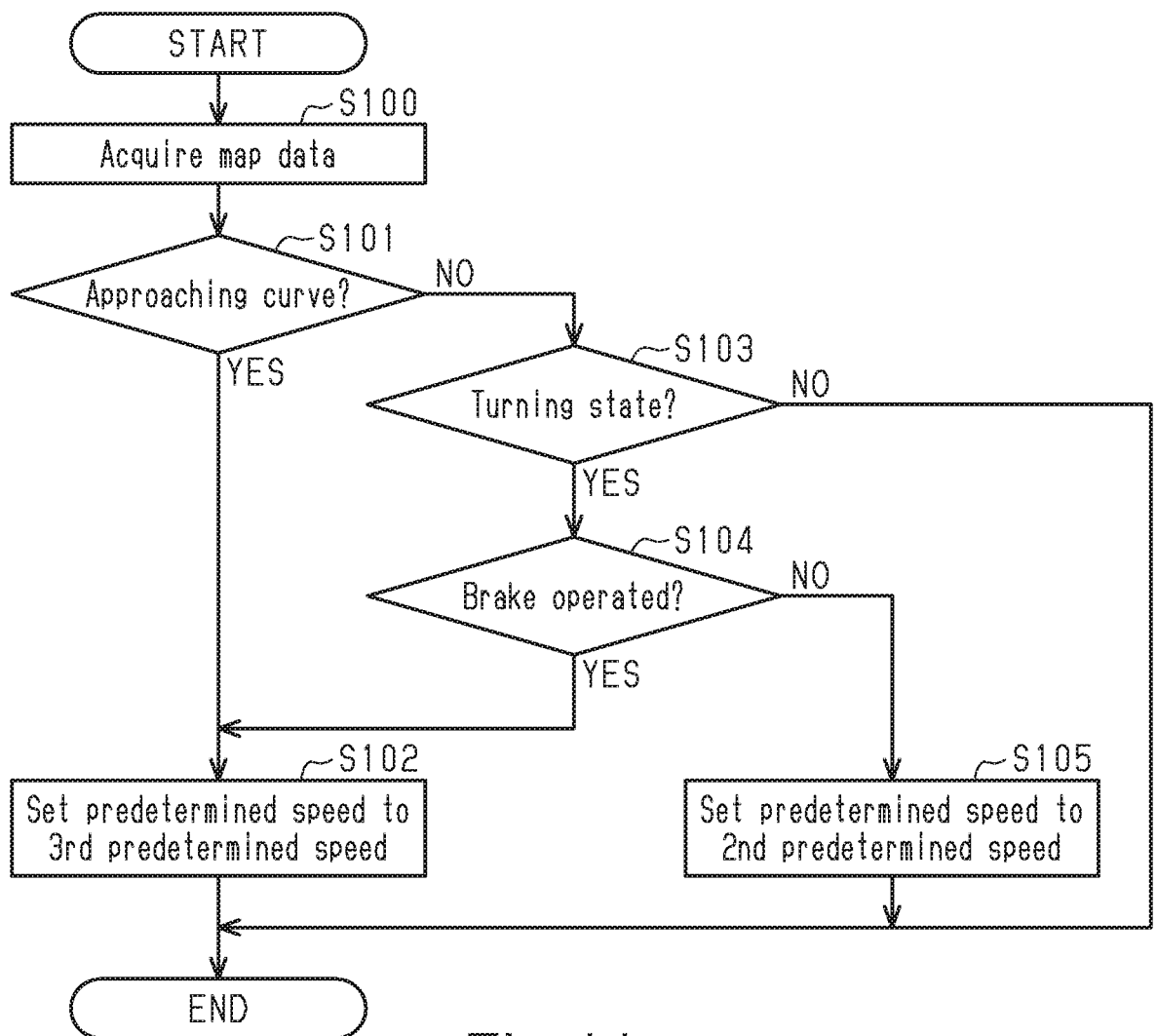
FIG. 11 is a flowchart of change control executed by the human-powered vehicle control device according to a third embodiment.

FIG. 11 is a flowchart showing an example of the change control. As shown in FIG. 11, the electronic controller 52 acquires the map data in step S100, and determines whether or not the human-powered vehicle is approaching the curve in step S101. Step S100 and step S101 are the same as step S71 and step S72 of the third change control shown in FIG. 9.

In a case where the human-powered vehicle 10 is approaching a curve (step S101: YES), the electronic controller 52 sets the predetermined speed VA to the third predetermined speed VA3 in step S102. In a case where the human-powered vehicle 10 is not approaching the curve (step S101: NO), that is, in a case where the straight road is continuing or in a case where the human-powered vehicle 10 has already entered the curve, the electronic controller 52 determines whether or not the human-powered vehicle 10 is in the turning state in step S103. The determination in step S103 is the same as the determination of the turning state in step S52 shown in FIG. 7.

In a case where the human-powered vehicle 10 is not in the turning state (step S103: NO), the electronic controller 52 temporarily ends the process. In a case where the human-powered vehicle 10 is in the turning state (step S103: YES), the electronic controller 52 determines whether or not the human-powered vehicle 10 is undergoing a braking operation in step S104. The determination in step S104 is performed depending on whether or not the second operation unit 58 is operated. In other words, in a case where the second operation unit 58 is operated, the electronic controller 52 determines that the human-powered vehicle 10 is undergoing a braking operation.

In a case where the human-powered vehicle 10 is undergoing a braking operation (step S104: YES), the electronic controller 52 proceeds to step S102. In a case where the human-powered vehicle 10 is not undergoing a braking operation (step S104: NO), the electronic controller 52 sets the predetermined speed VA to the second predetermined speed VA2 in step S105.

Fourth Embodiment

The control device 50 of a fourth embodiment will now be described with reference to FIG. 12. The control device 50 of the present embodiment differs from the control device 50 of the first embodiment in the contents of the change control. In the description hereafter, same reference numerals are given to those components that are the same as the corresponding components of the human-powered vehicle 10 in accordance with the first embodiment. Such components will not be described in detail.

In the change control, the electronic controller 52 of the control device 50 according to the present embodiment varies the predetermined speed VA in a case where the human-powered vehicle 10 is undergoing a braking operation regardless of whether or not the human-powered vehicle 10 is in the turning state. According to the change control of the present embodiment, for example, in a case where the human-powered vehicle 10 is undergoing a braking operation while the human-powered vehicle 10 is traveling on a hill, the motor 36 is controlled to rapidly stop the assistance of the propulsion of the human-powered vehicle 10 by the motor 36.

The electronic controller 52 includes a first predetermined speed VA1, a second predetermined speed VA2 that is lower than the first predetermined speed VA1, and a third predetermined speed VA3 that differs from the second predetermined speed VA2 as the predetermined speed. In one example, the third predetermined speed VA3 is lower than the second predetermined speed VA2. In a case where the human-powered vehicle 10 is undergoing a braking operation, the electronic controller 52 sets the predetermined speed VA to the third predetermined speed VA3.

Figure 12:
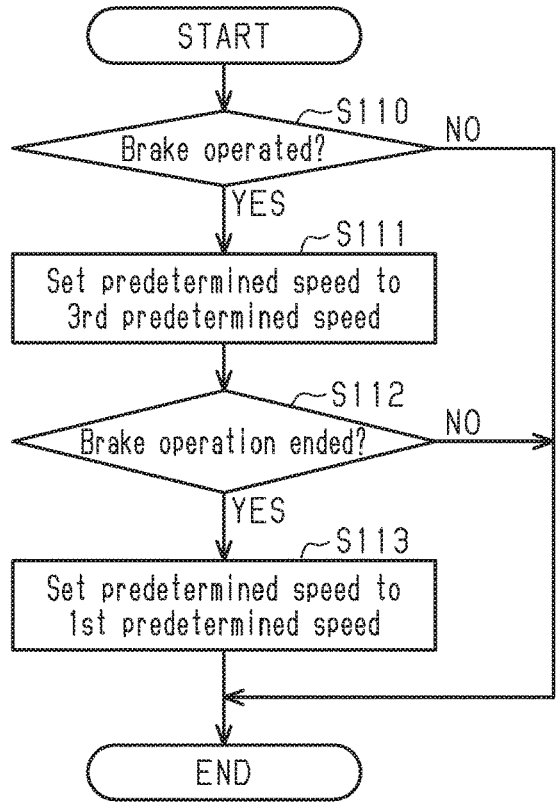
FIG. 12 is a flowchart of change control executed by the human-powered vehicle control device according to a fourth embodiment.

FIG. 12 is a flowchart showing an example of the change control. As shown in FIG. 12, the electronic controller 52 determines whether or not the human-powered vehicle 10 is undergoing a braking operation in step S110. The determination in step S110 is similar to the determination in step S104 of the change control in the third embodiment shown in FIG. 11.

In a case where the human-powered vehicle 10 is undergoing a braking operation (step S110: YES), the electronic controller 52 sets the predetermined speed VA to the third predetermined speed VA3 in step S111. Then, in step S112, the electronic controller 52 determines whether or not the braking operation of the human-powered vehicle 10 has ended. The electronic controller 52 determines that the braking operation of the human-powered vehicle 10 has ended based on a change from a state in which the second operation unit 58 is operated to a state in which the second operation unit 58 is not operated.

In a case where the braking operation of the human-powered vehicle 10 has ended (step S112: YES), the electronic controller 52 sets the predetermined speed VA to the first predetermined speed VA1 in step S113. In a case where the human-powered vehicle 10 is not undergoing a braking operation (step S110: NO) or the braking operation of the human-powered vehicle 10 is continued (step S112: NO), the electronic controller 52 temporarily ends the process.

Fifth Embodiment

The control device 50 of a fifth embodiment will be described with reference to FIG. 13. The control device 50 of the present embodiment is different from the control device 50 of the first embodiment in the contents of the change control. In the description hereafter, same reference numerals are given to those components that are the same as the corresponding components of the human-powered vehicle 10 in accordance with the first embodiment. Such components will not be described in detail.

In the case where the human-powered vehicle 10 is undergoing a braking operation at a time the human-powered vehicle 10 is in a turning state, the electronic controller 52 of the control device 50 according to the present embodiment executes the change control for controlling the motor 36 so as not to assist the propulsion of the human-powered vehicle 10. In one example, the electronic controller 52 does not drive the motor 36 in a case where the human-powered vehicle 10 is undergoing a braking operation at the time the human-powered vehicle 10 is in the turning state. The change control of the present embodiment switches between a state in which the motor 36 performs assistance in accordance with the human drive force H without varying the predetermined speed VA and a state in which the motor 36 is not driven.

Figure 13:
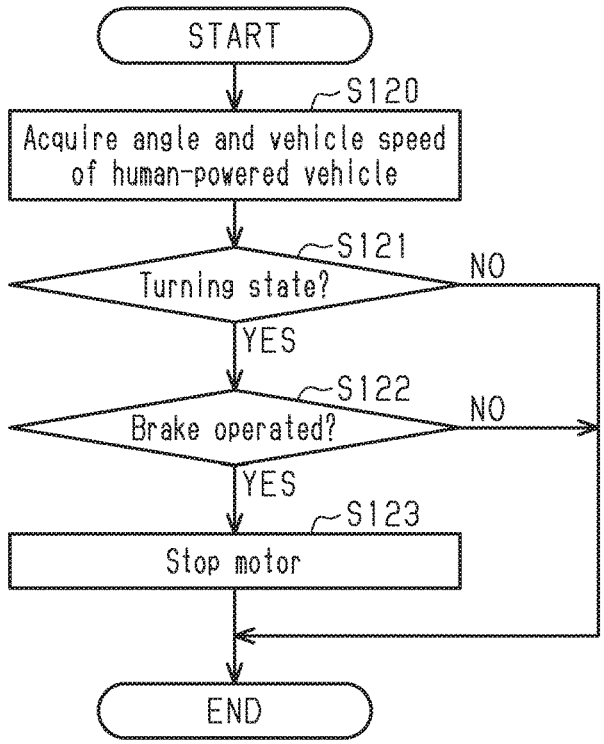
FIG. 13 is a flowchart of change control executed by the human-powered vehicle control device according to a fifth embodiment.

FIG. 13 is a flowchart showing an example of the change control. As shown in FIG. 13, the electronic controller 52 acquires the angle and the vehicle speed V of the human-powered vehicle 10 in step S120, and determines whether or not the human-powered vehicle 10 is in a turning state in step S121. Step S120 and step S121 are the same as step S51 and step S52 in the third change control of the first embodiment shown in FIG. 7.

In a case where the human-powered vehicle 10 is in a turning state (step S121: YES), the electronic controller 52 determines whether or not the human-powered vehicle 10 is undergoing a braking operation in step S122. Step S122 is the same as step S104 of the change control of the third embodiment shown in FIG. 11.

In a case where the human-powered vehicle 10 is undergoing a braking operation (step S122: YES), the electronic controller 52 stops the motor 36 in step S123. In a case where the human-powered vehicle 10 is not in the turning state (step S121: NO) or in a case where the human-powered vehicle 10 is not undergoing a braking operation (step S122: YES), the electronic controller 52 temporarily ends the process.

Modifications

The description related with the above embodiments exemplifies, without any intention to limit, applicable forms of a human-powered vehicle control device according to the present disclosure. In addition to the embodiments described above, the human-powered vehicle control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

The change control of the second embodiment and the change control of the third embodiment can be combined. In one example, in a case where a negative determination is given in step S104 of the change control in the third embodiment shown in FIG. 11, the process shifts to step S82 in the change control of the second embodiment shown in FIG. 10 instead of step S105.

In the change control of the first to third embodiments, the predetermined speed VA can be varied based on the human-powered vehicle 10 undergoing a braking operation. In one example, the electronic controller 52 includes a first predetermined speed VA1, a second predetermined speed VA2 that is lower than the first predetermined speed VA1, and a third predetermined speed VA3 that differs from the second predetermined speed VA2 as the predetermined speed VA. The electronic controller 52 sets the predetermined speed VA to the third predetermined speed VA3 in a case where the human-powered vehicle 10 is undergoing a braking operation. In one example, the third predetermined speed VA3 is lower than the second predetermined speed VA2.

The determination of whether or not the human-powered vehicle 10 is in a turning state can be performed with the map data of the communication device 68. In a case where the human-powered vehicle 10 is traveling along a curve in the map data, the electronic controller 52 determines that the human-powered vehicle 10 is in the turning state.

What is claimed is:

1. A human-powered vehicle control device comprising:
an electronic controller configured to control a motor that assists in propulsion of a human-powered vehicle, the electronic controller being further configured to drive the motor in correspondence with a human drive force upon determining a traveling speed of the human-powered vehicle is less than a predetermined speed that is higher than 0 km/h,
the electronic controller being further configured to vary the predetermined speed in correspondence with at least one of a state of the human-powered vehicle and a state of a road on which the human-powered vehicle travels, and
the electronic controller being further configured to restrict assistance of the propulsion of the human-powered vehicle upon determining the traveling speed of the human-powered vehicle is greater than or equal to the predetermined speed.

2. The human-powered vehicle control device according to claim 1, wherein
the state of the human-powered vehicle includes a first state and a second state that differs from the first state, and
the electronic controller is further configured to set the predetermined speed to a first predetermined speed while the human-powered vehicle is in the first state, and
the electronic controller is further configured to set the predetermined speed to a second predetermined speed that is lower than the first predetermined speed while the human-powered vehicle is in the second state.

3. The human-powered vehicle control device according to claim 2, wherein
the first predetermined speed is a fixed value.

4. The human-powered vehicle control device according to claim 1, wherein
the electronic controller is further configured not to drive the motor upon determining the human-powered vehicle is traveling at a traveling speed exceeding the predetermined speed.

5. The human-powered vehicle control device according to claim 1, wherein
the electronic controller is configured to vary the predetermined speed in correspondence with the state of the human-powered vehicle, and
the state of the human-powered vehicle includes at least one of a state of the traveling speed of the human-powered vehicle, a state of an angle of the human-powered vehicle, a state of a handlebar steering angle of the human-powered vehicle, and a turning state of the human-powered vehicle.

6. The human-powered vehicle control device according to claim 1, wherein
the electronic controller is further configured to vary the predetermined speed in correspondence with the traveling speed of the human-powered vehicle and at least one of a handlebar steering angle of the human-powered vehicle and an angle of the human-powered vehicle.

7. The human-powered vehicle control device according to claim 5, wherein
the angle of the human-powered vehicle includes at least one of a yaw angle, a pitch angle, and a roll angle.

8. The human-powered vehicle control device according to claim 5, wherein
the electronic controller is further configured to vary the predetermined speed in correspondence with the angle of the human-powered vehicle.

9. The human-powered vehicle control device according to claim 5, wherein
the electronic controller is further configured to set the predetermined speed to a first predetermined speed upon determining a roll angle serving as the angle of the human-powered vehicle is less than a first roll angle, and
the electronic controller is further configured to set the predetermined speed to a second speed that is lower than the first predetermined speed upon determining the roll angle is greater than or equal to the first roll angle.

10. The human-powered vehicle control device according to claim 5, wherein
the electronic controller is further configured to set predetermined speed to a first predetermined speed upon determining the handlebar steering angle of the human-powered vehicle is less than a first steering angle, and
the electronic controller is further configured to set the predetermined speed to a second speed that is lower than the first predetermined speed upon determining the handlebar steering angle is greater than or equal to the first steering angle.

11. The human-powered vehicle control device according to claim 5, wherein
the electronic controller is further configured to detect that the human-powered vehicle is in the turning state from the traveling speed of the human-powered vehicle and at least one of the angle of the human-powered vehicle and the handlebar steering angle of the human-powered vehicle.

12. The human-powered vehicle control device according to claim 5, wherein
the electronic controller is further configured to set the predetermined speed to the traveling speed of the human-powered vehicle at a point of time in which the turning state of the human-powered vehicle started upon determining the human-powered vehicle is in the turning state.

13. The human-powered vehicle control device according to claim 5, wherein
the electronic controller is further configured to set the predetermined speed to an average value of the traveling speed of the human-powered vehicle for a period from a time point in which the turning state of the human-powered vehicle started until a predetermined time upon determining the human-powered vehicle is in the turning state.

14. The human-powered vehicle control device according to claim 5, wherein
the electronic controller is further configured to set the predetermined speed to an average value of the traveling speed of the human-powered vehicle for a case where the human-powered vehicle travels over a distance from a predetermined location to a location where the turning state of the human-powered vehicle started upon determining the human-powered vehicle is in the turning state.

15. The human-powered vehicle control device according to claim 5, wherein
the electronic controller is further configured to vary the predetermined speed during at least part of a period from a time point in which the turning state of the human-powered vehicle started until a time point in which the turning state ended.

16. The human-powered vehicle control device according to claim 5, wherein
the electronic controller is further configured to vary the predetermined speed in correspondence with a stable state of the human-powered vehicle upon determining the human-powered vehicle is in the turning state.

17. The human-powered vehicle control device according to claim 16, wherein
the electronic controller is further configured to vary the predetermined speed based on the stable state, which includes an oversteering state in which the human-powered vehicle is oversteering while in the turning state, an understeering state in which the human-powered vehicle is understeering while in the turning state, and a stable traveling state in which the oversteering or the understeering has been reduced.

18. The human-powered vehicle control device according to claim 17, wherein
the electronic controller is further configured to vary the predetermined speed so that the stable state of the human-powered vehicle approaches the stable traveling state.

19. The human-powered vehicle control device according to claim 17, wherein
the electronic controller is further configured to lower the predetermined speed upon determining the stable state is the understeering state.

20. The human-powered vehicle control device according to claim 17, wherein
the electronic controller is further configured to raise the predetermined speed upon determining the stable state is the oversteering state.

21. The human-powered vehicle control device according to claim 17, wherein
the electronic controller is further configured not to vary the predetermined speed upon determining the stable state is the stable traveling state.

22. The human-powered vehicle control device according to claim 16, wherein
the electronic controller is further configured to calculate the stable state of the human-powered vehicle in correspondence with the traveling speed of the human-powered vehicle and at least one of a handlebar steering angle of the human-powered vehicle, an angle of the human-powered vehicle, and a wheelbase of the human-powered vehicle.

23. The human-powered vehicle control device according to claim 5, wherein
the electronic controller is further configured to vary the predetermined speed to a predetermined speed that was set before being varied in the turning state upon determining the turning state of the human-powered vehicle has ended.

24. The human-powered vehicle control device according to claim 1, wherein
the electronic controller is further configured to vary the predetermined speed in correspondence with a road surface resistance of the road.

25. The human-powered vehicle control device according to claim 1, further comprising
storage having a plurality of road surface resistances that are selectable in correspondence with the road, and
the electronic controller being further configured to vary the predetermined speed based on a selected road surface resistance from the road surface resistances prestored in the storage in which the selected road surface resistance corresponds to the road.

26. The human-powered vehicle control device according to claim 1, wherein
the electronic controller is further configured to vary the predetermined speed as the human-powered vehicle approaches a curve in the road.

27. The human-powered vehicle control device according to claim 5, further comprising
storage having first, second and third predetermined speeds prestored as the predetermined speed, the second predetermined speed is lower than the first predetermined speed, and the third predetermined speed differs from the second predetermined speed; and
the electronic controller being further configured to set the predetermined speed to the third predetermined speed upon determining a braking operation is performed on the human-powered vehicle as the human-powered vehicle approaches a curve in the road or while the human-powered vehicle is in a turning state.

28. The human-powered vehicle control device according to claim 1, wherein
the electronic controller includes storage having first, second and third predetermined speeds prestored as the predetermined speed, the second predetermined speed is lower than the first predetermined speed, and the third predetermined speed differs from the second predetermined speed; and
the electronic controller is further configured to set the predetermined speed to the third predetermined speed upon determining a braking operation is performed on the human-powered vehicle.

29. A human-powered vehicle control device comprising:
an electronic controller configured to control a motor that assists in propulsion of a human-powered vehicle,
the electronic controller being configured to receive a signal from a plurality of sensors regarding a roll angle of the human-powered vehicle and a vehicle speed of the human-powered vehicle,
the electronic controller being further configured to control the motor to restrict assistance of the propulsion of the human-powered vehicle upon determining a braking operation is performed on the human-powered vehicle while determining that the human-powered vehicle is in a turning state,
the electronic controller determining that the human-powered vehicle is in the turning state when the roll angle is greater than or equal to a first roll angle and the vehicle speed is greater than or equal to a first speed.

30. A human-powered vehicle control device comprising:
an electronic controller configured to control a motor that assists in propulsion of a human-powered vehicle,
the electronic controller being configured to acquire map data relating to a road traveled by the human-powered vehicle,
the electronic controller being further configured to control the motor to restrict assistance of the propulsion of the human-powered vehicle upon determining a braking operation is performed on the human-powered vehicle while determining that the human-powered vehicle is in a turning state, the electronic controller determining that the human-powered vehicle is in the turning state when the map data indicates that the human-powered vehicle is traveling along a curve.

31. The human-powered vehicle control device according to claim 1, wherein the electronic controller is configured to vary the predetermined speed in correspondence with the state of the human-powered vehicle, and the state of the human-powered vehicle includes a state of the traveling speed of the human-powered vehicle.

32. The human-powered vehicle control device according to claim 1, wherein the electronic controller is configured to vary the predetermined speed in correspondence with the state of the human-powered vehicle, and the state of the human-powered vehicle includes a state of an angle of the human-powered vehicle.

33. The human-powered vehicle control device according to claim 1, wherein the electronic controller is configured to vary the predetermined speed in correspondence with the state of the human-powered vehicle, and the state of the human-powered vehicle includes a state of a handlebar steering angle of the human-powered vehicle.

34. The human-powered vehicle control device according to claim 1, wherein the electronic controller is configured to vary the predetermined speed in correspondence with the state of the human-powered vehicle, and the state of the human-powered vehicle includes a turning state of the human-powered vehicle.

* * * * *